(12) United States Patent
Saito

(10) Patent No.: US 9,288,457 B2
(45) Date of Patent: Mar. 15, 2016

(54) IMAGE PROCESSING DEVICE, METHOD OF PROCESSING IMAGE, AND IMAGE PROCESSING PROGRAM INCLUDING FALSE COLOR CORRECTION

(71) Applicant: Sony Corporation, Tokyo (JP)

(72) Inventor: Yasushi Saito, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/395,095

(22) PCT Filed: Feb. 14, 2013

(86) PCT No.: PCT/JP2013/053455
§ 371 (c)(1),
(2) Date: Oct. 17, 2014

(87) PCT Pub. No.: WO2013/161349
PCT Pub. Date: Oct. 31, 2013

(65) Prior Publication Data
US 2015/0103212 A1    Apr. 16, 2015

(30) Foreign Application Priority Data

Apr. 24, 2012 (JP) ................. 2012-098544

(51) Int. Cl.
| H04N 9/64 | (2006.01) |
| H04N 9/04 | (2006.01) |
| G06T 5/00 | (2006.01) |
| G06T 5/20 | (2006.01) |
| G06T 3/40 | (2006.01) |

(52) U.S. Cl.
CPC .............. H04N 9/646 (2013.01); G06T 3/4015 (2013.01); G06T 5/005 (2013.01); G06T 5/20 (2013.01); H04N 9/045 (2013.01); *G06T 2207/10004* (2013.01); *G06T 2207/10024* (2013.01)

(58) Field of Classification Search
CPC ...... H04N 9/646; H04N 9/045; G06T 3/4015; G06T 5/005; G06T 5/20

USPC .............. 348/273, 276, 222.1, 242; 382/300, 382/275, 167, 264
See application file for complete search history.

(56) References Cited

U.S. PATENT DOCUMENTS

| 2002/0041331 A1 | 4/2002 | Xiaomang et al. |
| 2011/0050918 A1* | 3/2011 | Tachi ..................... 348/208.4 |
| 2011/0085052 A1* | 4/2011 | Honda ..................... 348/273 |
| 2015/0029358 A1* | 1/2015 | Kaizu ...................... 348/223.1 |

FOREIGN PATENT DOCUMENTS

| JP | 01-133492 A | 5/1989 |
| JP | 2002-077928 A | 3/2002 |
| JP | 2006-014261 A | 1/2006 |
| JP | 2009-124598 A | 6/2009 |
| JP | 2012-060602 A | 3/2012 |

* cited by examiner

*Primary Examiner* — Nhan T Tran
(74) *Attorney, Agent, or Firm* — Wolf, Greenfield & Sacks, P.C.

(57) ABSTRACT

There are provided a device and method that correct a false color occurring in a locally highlighted region in an image. A false color pixel is detected in data conversion processing of generating an RGB array image from an RGBW array image, low-band signals corresponding to respective RGBW colors that are different according to whether a pixel is a false color pixel, and the RGBW array is converted by interpolation processing to which the calculated low-band signals are applied to generate the RGB array image. The interpolation processing is performed using the low-band signals on an assumption that a W low-band signal mW, and RGB respective low-band signals mR, mG, and mB have a proportional relation in a local region. When a pixel of interest is a false color pixel, the low-band signal is calculated by an application of a low-pass filter having a coefficient in which a contribute rate of pixel values in the vicinity of the pixel of interest is made relatively lower than that of separated pixels.

10 Claims, 26 Drawing Sheets

(A) CAPTURED IMAGE

FIG. 2
PRIOR ART (a) RGB ARRAY (BAYER ARRAY)

(b) RGBW ARRAY

FIG. 6
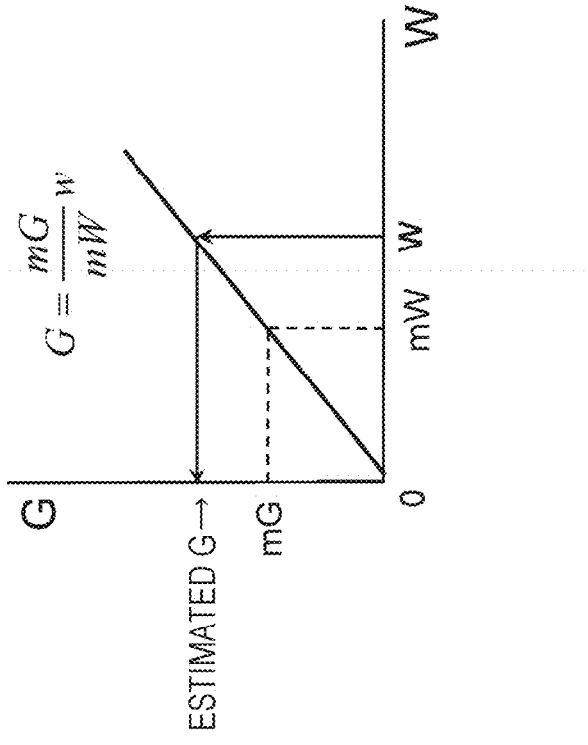
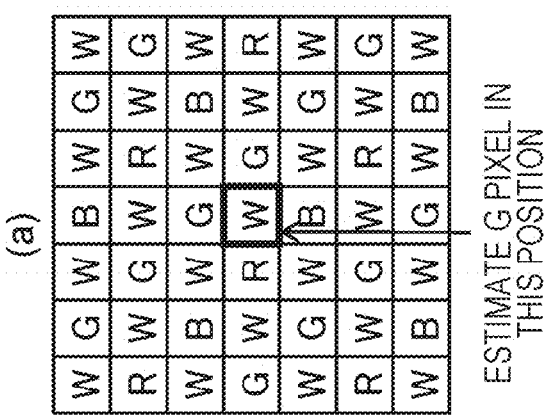

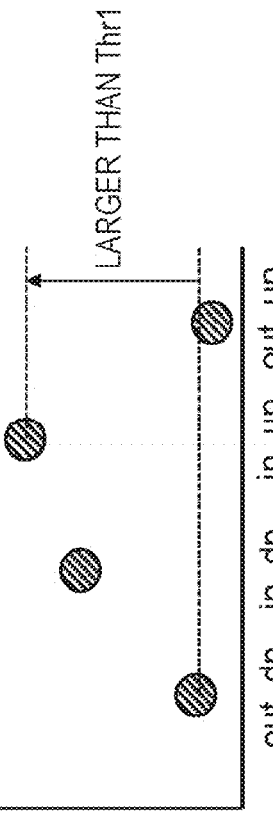
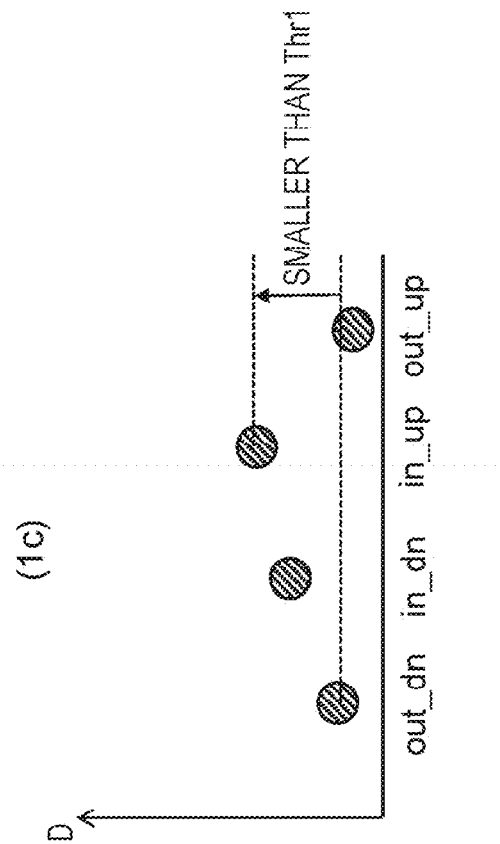
FIG. 8

FIG. 9
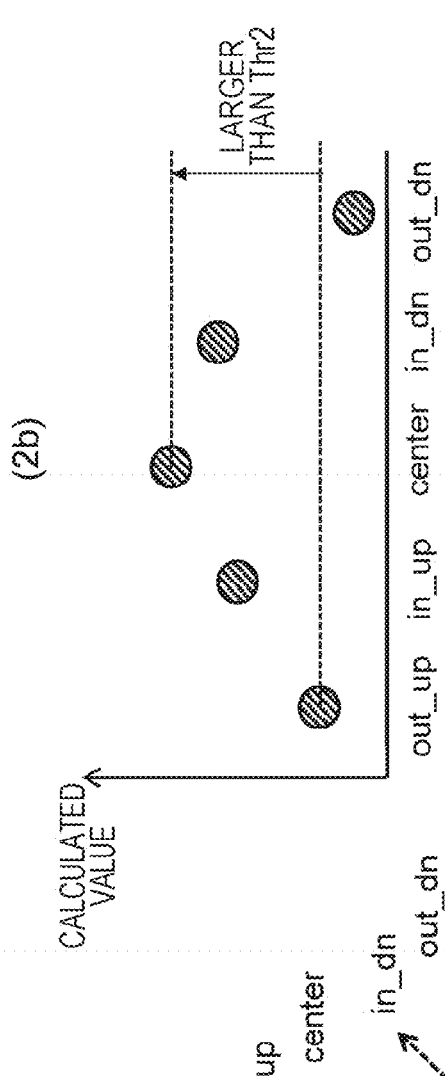
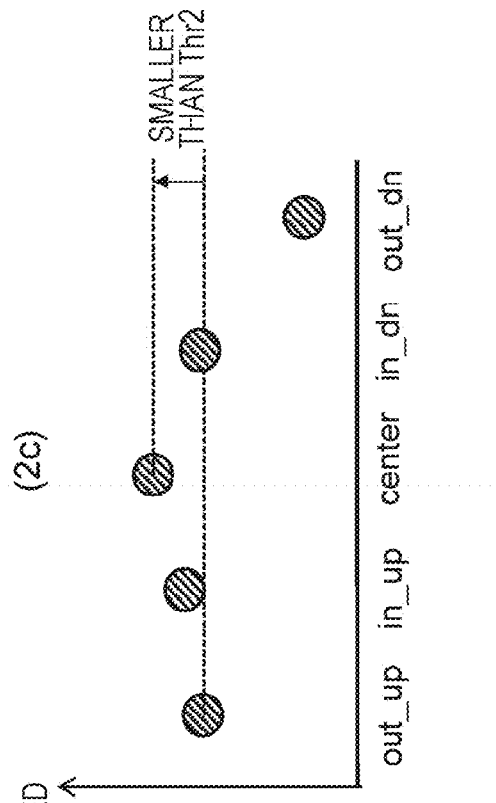
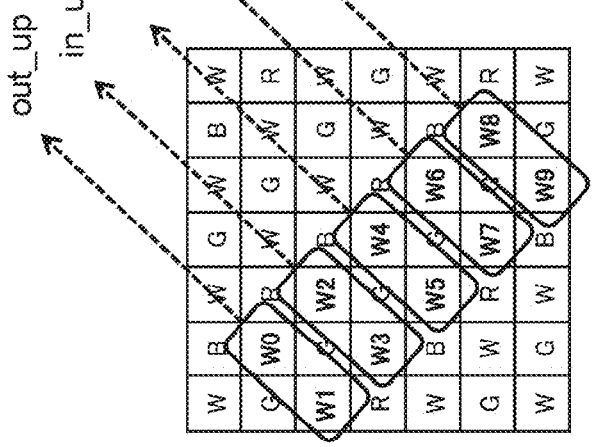

FIG. 17

(1a) INPUT PIXEL UNIT
(CENTER=W, LEFT AND LOWER
ADJACENT PIXELS=G)

(1b) mG CALCULATION LPF COEFFICIENT
SETTING EXAMPLE OF WHEN PIXEL OF
INTEREST ≠ BRIGHTNESS FALSE COLOR

COEFFICIENT
IS SET
RELATIVELY
HIGH mG /32

(1c) mG CALCULATION LPF COEFFICIENT
SETTING EXAMPLE OF WHEN PIXEL OF
INTEREST = BRIGHTNESS FALSE COLOR

COEFFICIENT
IS SET
RELATIVELY
LOW mG /16

IMAGE PROCESSING DEVICE, METHOD OF PROCESSING IMAGE, AND IMAGE PROCESSING PROGRAM INCLUDING FALSE COLOR CORRECTION

This application is the National Stage of International Application No. PCT/JP2013/053455, filed in the Japanese Patent Office as a Receiving Office on Feb. 14, 2013, which claims priority to Japanese Patent Application Number 2012-098544, filed in the Japanese Patent Office on Apr. 24, 2012, each of which is hereby incorporated by reference in its entirety.

TECHNICAL FIELD

The present invention relates to an image processing device, a method of processing an image, and a program, and especially relates to an image processing device, a method of processing an image, and a program for executing correction processing of a false color occurring in an image.

BACKGROUND ART

For example, when sunshine filtering through leaves is captured by a camera as illustrated in FIG. 1, a phenomenon in which highlighted regions h1 to h5 surrounded by the dotted line circles are colored with green or magenta is seen.

FIG. 2(a) illustrates a Bayer array made of RGB pixels and used in many conventional cameras.

FIG. 2(b) illustrates a RGBW array which has been increasingly used in recent cameras. Each of RGB pixels is a pixel including a filter selectively transmitting light of a wavelength region of R, G or B, and a W pixel is a pixel including a filter that transmits almost all the visible light of the RGB wavelength light.

When the image illustrated in FIG. 1, that is, the image having a high brightness region of a small area of about several pixels like the sunshine filtering through leaves is captured with the camera including an imaging device of the RGBW array including the W pixels as illustrated in FIG. 2(b), a false color such as green or magenta is generated in the highlighted regions h1 to h5 which are small high brightness regions.

Hereinafter, the false color, which occurs in the highlighted region of a small area of about several pixels, is called brightness false color.

A principle of occurrence of the brightness false color will be described with reference to FIGS. 3(a) and 3(b).

For example, as illustrated in FIG. 3(a), when the area of the highlighted region is small and the pixels of the highlighted region are configured from almost only the W and G pixels, pixel values of the G pixels are relatively larger than peripheral R and B pixels. As a result, color balance is lost, and the region is colored to green.

Further, as illustrated in FIG. 3(b), when the area of the highlighted region is small and the pixels of the highlighted region are configured from almost the W, R, and B pixels, the pixel values of the R and B pixels are relatively larger than the pixel values of the peripheral G pixels. As a result, the color balance is lost, and the region is colored to magenta.

As described above, various patterns of false colors, that is, the brightness false colors are generated, depending on the configuration of the pixels included in the highlighted region that is a high brightness portion.

To decrease such a brightness false color, processing of correcting the false color occurring region using an optical low-pass filter is effective. That is, the processing is to decrease a high-frequency component of light incident on the imaging device, and to correct extreme change of the pixel value into gentle change. However, this method causes a decrease in resolution, resulting in deterioration of image quality, and thus it cannot be said that the method is an appropriate method.

Note that, a technology to decrease the false color typically called purple fringing is described in, for example, Patent Document 1 (Japanese Patent Application Laid-Open No. 2009-124598) and Patent Document 2 (Japanese Patent Application Laid-Open No. 2006-14261).

The purple fringing is caused mainly by an aberration of a lens included in the camera, and is a false color occurring around a high contrast edge of blown-out highlight.

However, the brightness false color described above is caused in a pixel region that does not have blown-out highlights. Therefore, there are some cases which cannot be handled by the conventional processing of decreasing the purple fringing.

CITATION LIST

Patent Document

Patent Document 1: Japanese Patent Application Laid-Open No. 2009-124598
Patent Document 2: Japanese Patent Application Laid-Open No. 2006-14261

SUMMARY OF THE INVENTION

Problems to be Solved by the Invention

The present disclosure has been made in view of the above problems, and an objective is to provide an image processing device, a method of processing an image, and a program for detecting false color, which occurs in a high brightness region (highlighted region) of a small area of about several pixels, and performing correction, thereby outputting a high-quality image.

Further, in a configuration of one embodiment of the present disclosure, an objective is to provide an image processing device, a method of processing an image, and a program for inputting a mosaic image of an array including a W (white) pixel before de-mosaic, as an object to be processed, detecting a false color, which occurs in a high brightness region (highlighted region) of a small area of about several pixels, and performing correction, thereby outputting a high-quality image.

Solution to Problems

According to a first aspect of the present disclosure, there is provided an image processing device including:
  a data conversion processing unit configured to have an RGBW array image as an input image, and to generate an RGB array image as an output image,
  the data conversion processing unit including
  a false color detection unit configured to detect a false color pixel in the input image, and to output detection information,
  a low-band signal calculation unit configured to be input the detection information from the false color detection unit, and to change a processing aspect according to the detection information to calculate low-band signals corresponding to respective RGBW colors, and a pixel interpolation unit configured to execute pixel conversion of the RGBW array of the input image by pixel interpolation to which the low-band signals calculated by the low-band signal calculation unit to generate the RGB array image, and the interpolation processing unit calculates an interpolation pixel value on an assumption that a low-band signal mW of a W pixel and low-band signals mR, mG, and mB of respective RGB pixels have a proportional relation in a local region.

Further, according to one embodiment of the image processing device of the present disclosure, when having been input the detection information that a pixel of interest is the false color pixel from the false color detection unit, the low-band signal calculation unit applies a low-pass filter to which a low-pass filter coefficient in which a pixel value contribution rate of a pixel near the pixel of interest is made relatively lower than that of a pixel separated from the pixel of interest is set to calculate the low-band signals.

Further, according to one embodiment of the image processing device of the present disclosure, when having been input the detection information that a pixel of interest is not the false color pixel from the false color detection unit, the low-band signal calculation unit applies a low-pass filter to which a low-pass filter coefficient in which a pixel value contribution rate of a pixel near the pixel of interest is made relatively higher than that of a pixel separated from the pixel of interest is set to calculate the low-band signals.

Further, according to one embodiment of the image processing device of the present disclosure, the false color detection unit detects presence/absence of existence of a locally highlighted region that is a locally high brightness region in the input image, and when a pixel of interest is included in the locally highlighted region, the false color detection unit determines that the pixel of interest is the false color pixel.

Further, according to one embodiment of the image processing device of the present disclosure, the false color detection unit detects incline information of W pixels near a pixel of interest, and when a W pixel value near the pixel of interest is higher than a peripheral W pixel value in both of two perpendicular directions, the false color detection unit determines that the pixel of interest is included in a locally highlighted region that is a locally high brightness region, and the pixel of interest is the false color pixel.

Further, according to one embodiment of the image processing device of the present disclosure, the false color detection unit (a) calculates W pixel low-frequency component signals corresponding to respective lines based on pixel values of a plurality of W pixels in a plurality of diagonally lower right lines set near a pixel of interest, and executes comparison processing between a difference value Diff1 between a maximum value of the W pixel low-frequency component signals of a plurality of inner-side lines close to the pixel of interest and a maximum value of the W pixel low-frequency component signals of a plurality of outer-side lines distant from the pixel of interest, and a threshold Thr1, and (b) calculates W pixel low-frequency component signals corresponding to respective lines based on pixel values of a plurality of W pixels in a plurality of diagonally upper right lines set near a pixel of interest, and executes comparison processing between a difference value Diff2 between a maximum value of the W pixel low-frequency component signals of a plurality of inner-side lines close to the pixel of interest and a maximum value of the W pixel low-frequency component signals of a plurality of outer-side lines distant from the pixel of interest, and a threshold Thr2, and as comparison results of the two cases of the above (a) and (b), when the difference value is larger than the threshold in both cases, the false color detection unit determines that the pixel of interest is the false color pixel.

Note that the threshold Thr1 and the threshold Thr2 may be fixed values, may be values that can be set by the user, or may be automatically calculated.

Further, according to one embodiment of the image processing device of the present disclosure, the false color detection unit detects a false color occurring when a W pixel and a G pixel are concentrated in a locally highlighted region that is a locally high brightness region in the input image, or when a W pixel, an R pixel, and a B pixel are concentrated in the locally highlighted region.

Further, according to one embodiment of the image processing device of the present disclosure, the false color detection unit detects W pixels having a high pixel value from the input image, compares a configuration pattern of the detected W pixels having a high pixel value, and a registered highlighted region pattern that is a shape of a locally high brightness region recorded in a memory in advance, and determines that a pixel included in the configuration pattern of the W pixels having a high pixel value is the false color pixel when the configuration pattern of the detected W pixels having a high pixel value match the registered highlighted region pattern.

Further, according to one embodiment of the image processing device of the present disclosure, the low-band signal calculation unit applies a low-pass filter to which a low-pass filter coefficient in which a pixel value contribution rate of a highlighted region is made relatively lower than that of a pixel outside the highlighted region, according to the registered highlighted region pattern determined to match the configuration pattern of the W pixels having a high pixel value by the false color detection unit, is set to calculate the low-band signals.

Further, according to a second aspect of the present disclosure, there is provided a method of processing an image executed in an image processing device, the method including:

by a data conversion processing unit, executing data conversion processing of having an RGBW array image as an input image, and generating an RGB array image as an output image, in the data conversion processing, executing false color detection processing of detecting a false color pixel of the input image, and outputting detection information, low-band signal calculation processing of being input the detection information, and changing a processing aspect according to the detection information to calculate low-band signals corresponding to respective RGBW colors, and pixel interpolation processing of executing pixel conversion of the RGBW array of the input image to generate the RGB array image by pixel interpolation to which the low-band signals are applied, and in the interpolation processing, calculating an interpolation pixel value based on an assumption that a low-band signal mW of a W pixel and low-band signals mR, mG, and mB of respective RGB pixels have a proportional relation in a local region.

Further, according to a third aspect of the present disclosure, there is provided a program for causing an image processing device to execute image processing, the image processing including:

causing a data conversion processing unit to execute data conversion processing step of having an RGBW array image as an input image, and generating an RGB array image as an output image, in the data conversion processing step, causing the data conversion processing unit to execute a false color detection processing of detecting a false color pixel of the input image, and outputting detection information, low-band signal calculation processing of being input the detection information, and changing a processing aspect according to the detection information to calculate low-band signals corresponding to respective RGBW colors, and pixel interpolation processing of executing pixel conversion of the RGBW array of the input image to generate the RGB array image by pixel interpolation to which the low-band signals are applied, and in the interpolation processing, calculating an interpolation pixel value based on an assumption that a low-band signal mW of a W pixel and low-band signals mR, mG, and mB of respective RGB pixels have a proportional relation in a local region.

Note that the program of the present disclosure is a program that can be provided with a storage medium or a communication medium provided in a computer-readable format to an information processing device or a computer system that can execute various program codes. Such a program is provided in a computer-readable format, whereby processing according to the program is realized on the information processing device or the computer system.

Other objectives, characteristics, and advantages of the present disclosure will become clear from the detailed description based on the embodiments and the appended drawings of the present disclosure below. Note that the system in the present specification is a logical set configuration of a plurality of devices, and is not limited to a configuration in which devices of respective configurations are included in the same housing.

Effects of the Invention

According to a configuration of one embodiment of the present disclosure, a device and a method that perform correction of a false color, which occurs in a locally highlighted region of an image, are realized.

To be specific, a false color pixel is detected in data conversion processing of generating an RGB array image from an RGBW array image, low-band signals corresponding to respective RGBW colors that are different according to whether a pixel is a false color pixel, and the RGBW array is converted by interpolation processing to which the calculated low-band signals are applied to generate the RGB array. The interpolation processing is performed using the low-band signals on an assumption that a W low-band signal mW, and RGB respective low-band signals mR, mG, and mB have a proportional relation in a local region. When a pixel of interest is a false color pixel, the low-band signal is calculated by an application of a low-pass filter having a coefficient in which a contribute rate of pixel values in the vicinity of the pixel of interest is made relatively lower than that of separated pixels.

With the processing, a false color, which occurs in a locally highlighted region of the image, is corrected, together with re-mosaic processing of converting the RGBW array image into the RGB array, and a high-quality image from which the false color has been removed or decreased can be generated and output.

BRIEF DESCRIPTION OF DRAWINGS

FIGS. 2(a) and 2(b) are diagrams illustrating configuration examples of pixel arrays of an imaging apparatus.

FIGS. 6(a) and 6(b) are diagrams illustrating pixel interpolation processing executed by the image processing device of the present disclosure.

FIGS. 8(1a) to 8(1c) are diagram illustrating processing executed by a false color detection unit of the image processing device of the present disclosure.

FIGS. 9(2a) to 9(2c) are diagrams illustrating processing executed by the false color detection unit of the image processing device of the present disclosure.

FIGS. 17(1a) to 17(1c) are diagrams illustrating processing executed by a low-band signal calculation unit of the image processing device of the present disclosure.

FIGS. 18(2a) to 18(2c) are diagrams illustrating processing executed by the low-band signal calculation unit of the image processing device of the present disclosure.

FIGS. 19(3a) to 19(3c) are diagrams illustrating processing executed by the low-band signal calculation unit of the image processing device of the present disclosure.

FIGS. 20(4a) to 20(4c) are diagrams illustrating processing executed by the low-band signal calculation unit of the image processing device of the present disclosure.

FIGS. 22(a) to 22(g) are diagrams illustrating processing executed by the false color detection unit of the image processing device of the present disclosure.

MODE FOR CARRYING OUT THE INVENTION

Hereinafter, details of an image processing device, a method of processing an image, and a program of the present disclosure will be described with reference to the drawings. Note that the description will be given according to the following items.
1. A configuration and processing of a first embodiment of an imaging processing device of the present disclosure
2. A modification of a false color detection unit and a low-band signal calculation unit
3. Effects by processing of an image processing device of the present disclosure
4. Conclusion of configurations of the present disclosure
[1. A Configuration and Processing of a First Embodiment of an Imaging Processing Device of the Present Disclosure]

An image processing device of the present disclosure performs processing with respect to acquired data of an imaging device (image sensor) that includes RGBW-type color filters including a filter corresponding to white (W) that transmits all light of RGB wavelengths, in addition to RGB filters that selectively transmit the light of the respective RGB wavelengths.

To be specific, the image processing device analyzes signals of a two-dimensional pixel array in which pixels serving as a main component of a brightness signal are arranged in a checkered pattern manner, and a plurality of colors of pixels serving as color information components are arranged in the rest of the portion, and performs pixel conversion. Note that a color of the main component of the brightness signal is white or green.

Figure 2:
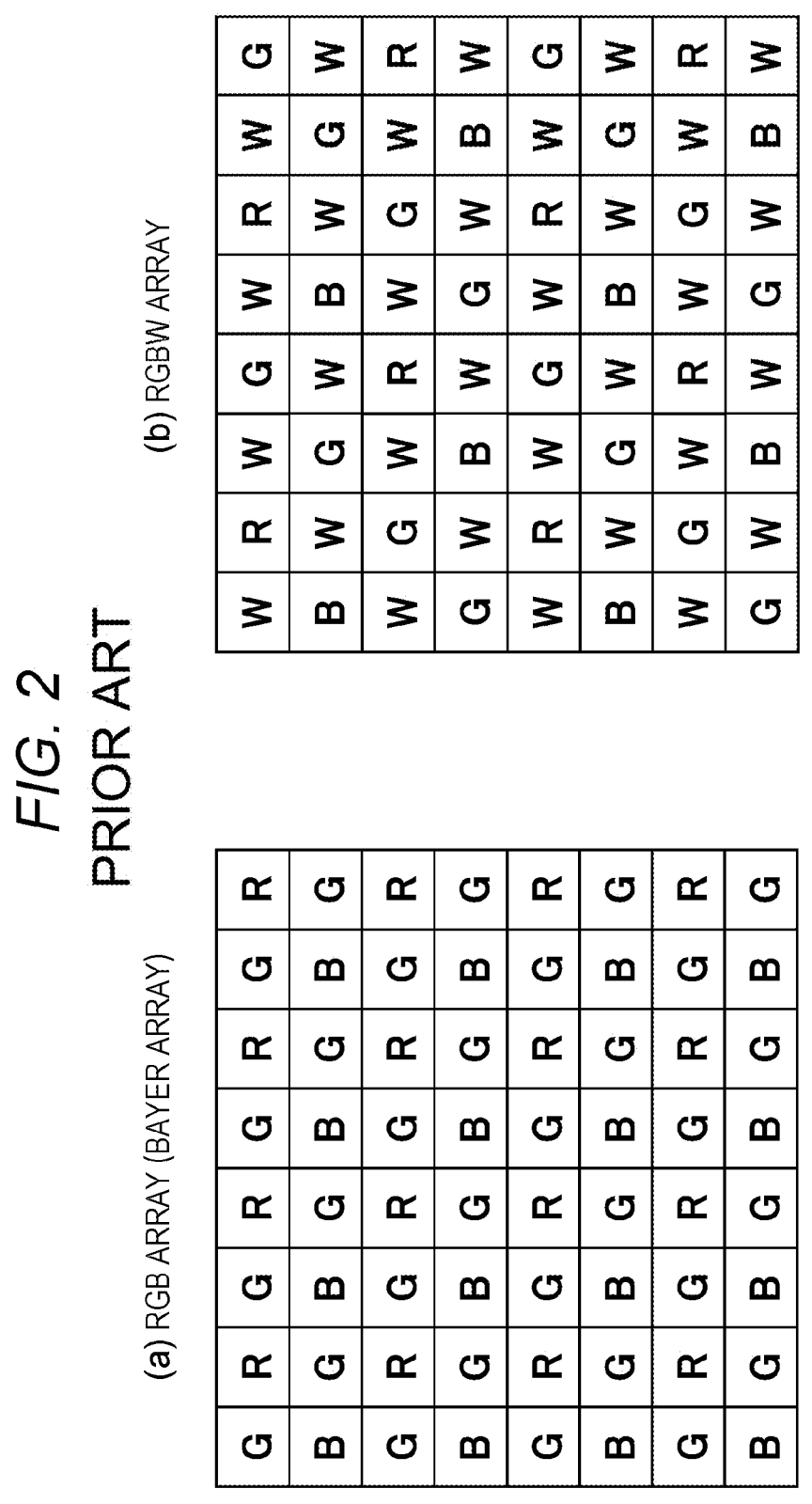

The image processing device of the present disclosure executes processing of converting the acquired data of the imaging device (image sensor) having the RGBW-type color filters including white (W) as illustrated in FIG. 2(b) into an RGB array (for example, a Bayer array) as illustrated in FIG. 2(a). Hereinafter, such processing of converting a color array is called re-mosaic processing. Note that details of the re-mosaic processing is described in Japanese Patent Application Laid-Open No. 2011-182354, and the disclosed re-mosaic processing can be applied to the image processing device of the present disclosure.

The image processing device of the present disclosure executes processing of correcting a brightness false color in this conversion processing (re-mosaic processing). The brightness false color is a false color that occurs in a highlighted region of a small area of about several pixels.

A configuration example and a processing example of the image processing device according to one embodiment of the present disclosure will be described with reference to FIG. 4.

Figure 4:
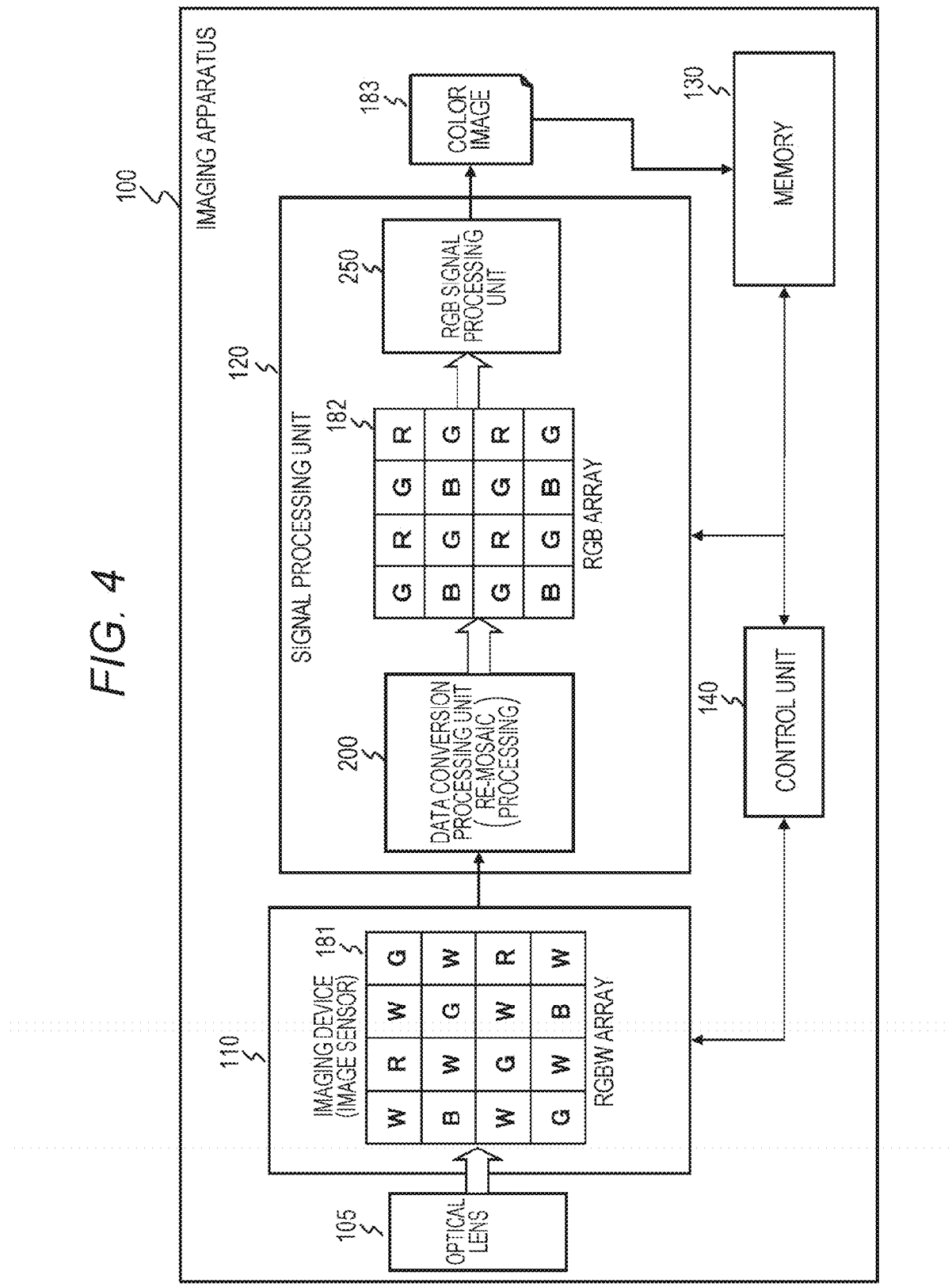
FIG. 4 is a diagram illustrating a configuration example of an image processing device of the present disclosure.

FIG. 4 is a diagram illustrating a configuration example of an imaging apparatus 100 according to one embodiment of the image processing device of the present disclosure. The imaging apparatus 100 includes an optical lens 105, an imaging device (image sensor) 110, a signal processing unit 120, a memory 130, and a control unit 140.

Note that the imaging apparatus 100 illustrated in FIG. 4 is one aspect of the image processing device of the present disclosure. A device such as a PC is also included in an example of the image processing device of the present disclosure. The image processing device like a PC does not include the optical lens 105 and the imaging device 110 of the imaging apparatus 100 illustrated in FIG. 4, and is configured from other configuration elements. The imaging apparatus 100 of a PC has a configuration including an input unit of acquisition data or a storage unit of the imaging device 110. To be specific, the imaging apparatus 100 is a still camera, a video camera, or the like. An information processing device capable of performing image processing, such as a PC, is included in one aspect of the image processing device 120.

Hereinafter, the imaging apparatus 100 will be described as a representative example of an image processing device of the present invention. The imaging device (image sensor) 110 of the imaging apparatus 100 illustrated in FIG. 4 has a configuration provided with a filter including an RGBW array 181 having white (W) illustrated in FIG. 2(b). To be specific, the imaging device 100 analyzes signals of a two-dimensional pixel array in which pixels serving as a main component of the brightness signal are arranged in a checkered pattern manner, and a plurality of colors of pixels serving as color information components is arranged in the rest of the portion, and performs pixel conversion. Note that the color of the main component of the brightness signal is white or green.

In the embodiments described below, the imaging device (image sensor) 110 is an imaging device provided with a filter having the following four types of spectral characteristics:
    red (R) that transmits a wavelength near red;
    green (G) that transmits a wavelength near green;
    blue (B) that transmits a wavelength near blue; and
    white (W) that transmits light of almost all wavelengths of the RGB.

The imaging device 110 including the filter of the RGBW array 181 receives any of RGBW light in pixel units through the optical lens 105, and generates and outputs an electrical signal corresponding to intensity of the received light signal by photoelectric conversion. A mosaic image made of the four types of RGBW spectrums can be obtained by the imaging device 110.

An output signal of the imaging device (image sensor) 110 is input to a data conversion processing unit 200 of the signal processing unit 120.

The data conversion processing unit 200 executes conversion processing from the RGBW array 181 to the RGB array 182. The data conversion processing unit 200 executes processing of correcting the brightness false color in the pixel array conversion processing.

The RGB array 182 generated by the data conversion processing unit 200, that is, data having a Bayer array is data having a color array obtained by an imaging device such as a conventional camera. The color array data is input to an RGB signal processing unit 250.

The RGB signal processing unit 250 performs similar processing to a signal processing unit provided in the conventional camera. To be specific, the RGB signal processing unit 250 executes de-mosaic processing, white balance adjustment processing, γ correction processing, and the like, and generates a color image 183. The generated color image 183 is recorded in a memory 130.

The control unit 140 executes control of the series of processing. For example, a program that causes the control unit 140 to execute the series of processing is stored in the memory 130. The control unit 140 executes the program read from the memory 130 to control the series of processing.

A detailed configuration of the data conversion processing unit 200 will be described with reference to FIG. 5. The data conversion processing unit 200 executes conversion processing (re-mosaic processing) from the RGBW array 181 to the RGB array 182. Further, the data conversion processing unit 200 executes processing for decreasing the brightness false color together with the conversion processing.

An input pixel unit to the data conversion processing unit 200 is 7 pixels×7 pixels having a pixel to be processed for pixel value conversion in the center, the pixel value conversion being executed as processing of a decrease in the brightness false color and pixel array conversion. That is, the data conversion processing unit 200 performs processing in which a 7×7 pixel reference region having the pixel to be processed as a center is set. Note that pixels to be processed are changed in turn, and the data conversion processing unit 200 performs the processing with respect to the pixels in turn.

Note that setting of the size of the reference region, which is set as the input pixel unit, to 7 pixels×7 pixels is an example, and a region having a size other than the size may be set as the input pixel unit (reference region).

Figure 5:
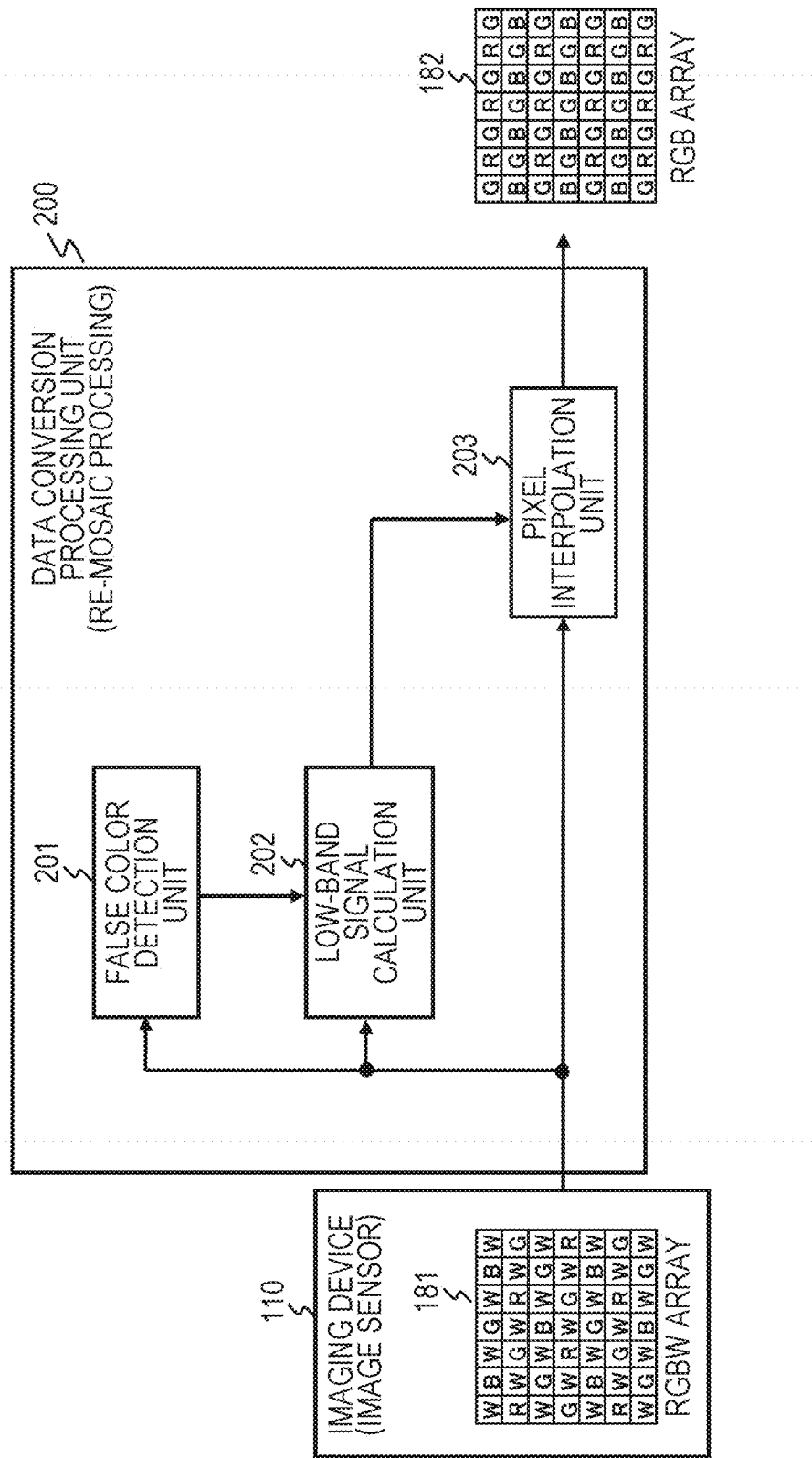
FIG. 5 is a diagram illustrating a configuration example of a data conversion processing unit of the imaging processing device of the present disclosure.

The data conversion processing unit 200 includes, as illustrated in FIG. 5, a false color detection unit 201, a low-band signal calculation unit 202, and a pixel interpolation unit 203.

The pixel interpolation unit 203 interpolates the central pixel in the region of the input pixel unit so that the image having the RGBW array 181 that is an output of the imaging device 110 becomes the RGB array 182.

The pixel interpolation processing is performed as processing of selecting pixels, for example, having the same color as any of RGB to be set, from the reference region of 7×7 pixels, and using pixel values of reference pixels while having the selected pixel values as reference pixels to calculate a pixel value of the pixel to be processed, that is, to calculate a pixel value of a central pixel of the 7×7 pixels.

Note that, in the interpolation processing, existing various methods such as processing of selecting the reference pixel in consideration of an edge direction, and a method of using correlation between the W pixel and the RGB pixels in the reference region, are applicable.

An example of the interpolating processing of when the G pixel is interpolated with the W pixel in the central of the input pixel unit (here, 7 pixels×7 pixels) will be described with reference to FIGS. 6(a) and 6(b).

FIG. 6(a) illustrates the input pixel unit (7×7 pixel region) having the W pixel in the center, the W pixel being the pixel of interest to serve as a pixel to be converted.

First, a low-band signal mW of the W pixels based on the pixel values of the W pixels in the reference region where the input pixel unit (7×7 pixel region) is the reference region.

For example, the low-band signal mW is calculated by low-pass filter application processing with respect to the pixel values of the W pixels in the reference region.

Similarly, a low-band signal of the G pixels is calculated from the G pixels in the input pixel unit (reference region). This low-band signal is a low-band signal mG.

The pixel value of the W pixel that is the pixel of interest to serve as the pixel to be converted is w. At this time, the G pixel to be set to the position of the pixel of interest, that is, the value G of the G pixel to be interpolated is calculated according to (Expression 1) below:

$$G = mG/mW \times w \quad \text{(Expression 1)}$$

The interpolation processing is interpolating processing based on estimation that the low-band signal mW of the W pixel and the low-band signal mG of the G pixel are proportional to each other in a local region.

That is, in a narrow local region like the reference region of the 7×7 pixels set in the present embodiment, it is estimated that the proportional relation between the low-band signal mW of the W pixel and the low-band signal mG of the G pixel is established, as illustrated in FIG. 6(b), and the G pixel value in the W pixel position is estimated according to the (Expression 1) based on the proportional relation.

Note that, when the RGBW pixel array is converted into the RGB pixel array, the following pieces of processing are necessary:

processing of converting the G pixel into the R or B pixel;
processing of converting the R pixel into the B pixel; and
processing of converting the B pixel into the R pixel, in addition to the processing of converting the W pixel into the G pixel.

When these pieces of conversion processing are performed, the W pixels of the reference region are set to a pixel color of a conversion destination according to the pixel color of the conversion destination of conversion between the pixels of interest, and the pixel value of the pixel of interest is calculated, on an assumption that the following relations are established in the local region, for example, the 7×7 reference region:

the proportional relation between the low-band signal mW of the W pixel and the low-band signal mG of the G pixel;
the proportional relation between the low-band signal mW of the W pixel and the low-band signal mR of the R pixel; and
the proportional relation between the low-band signal mW of the W pixel and the low-band signal mB of the B pixel.

Note that this interpolating processing is described in Japanese Patent Application Laid-Open No. 2011-182354, which is an earlier application of the present applicant, and the disclosed processing can be applied to the image processing device of the present disclosure.

Note that, in the processing of the present disclosure, processing of changing a calculation processing aspect of the low-band signals mR, mG, mB, and mW corresponding to the RGBW pixels applied to the pixel value conversion processing of the pixel interpolation unit 203 is performed, according to presence/absence of detection of the brightness false color.

The false color detection unit 201 of FIG. 5 determines whether the pixel of interest is the brightness false color pixel, and outputs the determination information to the low-band signal calculation unit 202.

The low-band signal calculation unit 202 changes the calculation processing aspect of the low-band signals mR, mG, mB, and mW corresponding to the RGBW pixels applied in the pixel value conversion processing of the pixel interpolation unit 203, according to the determination information, calculates the low-band signals mR, mG, mB, and mW, and outputs the calculated low-band signals mR, mG, mB, and mW to the pixel interpolation unit 203.

The pixel interpolation unit 203 performs the pixel interpolating processing as the re-mosaic processing of converting the RGBW pixel array into the RGB pixel array, applying the low-band signals mR, mG, mB, and mW input from the low-band signal calculation unit 202.

Note that the pixel interpolation processing executed by the pixel interpolation unit 203 is processing according to the processing described in Japanese Patent Application Laid-Open No. 2011-182354, which is an earlier application of the applicant, other than using the low-band signals mR, mG, mB, and mW input from the low-band signal calculation unit 202.

Hereinafter, processing of detecting the brightness false color in the false color detection unit 201 and processing of calculating the low-band signals (mR, mG, mB, and mW) in the low-band signal calculation unit 202 will be described.

The false color detection unit 201 executes processing of detecting the brightness false color by using the input pixel unit (7×7 pixels) as the reference region and applying the pixel values of the W pixels in the reference region.

Figure 1:
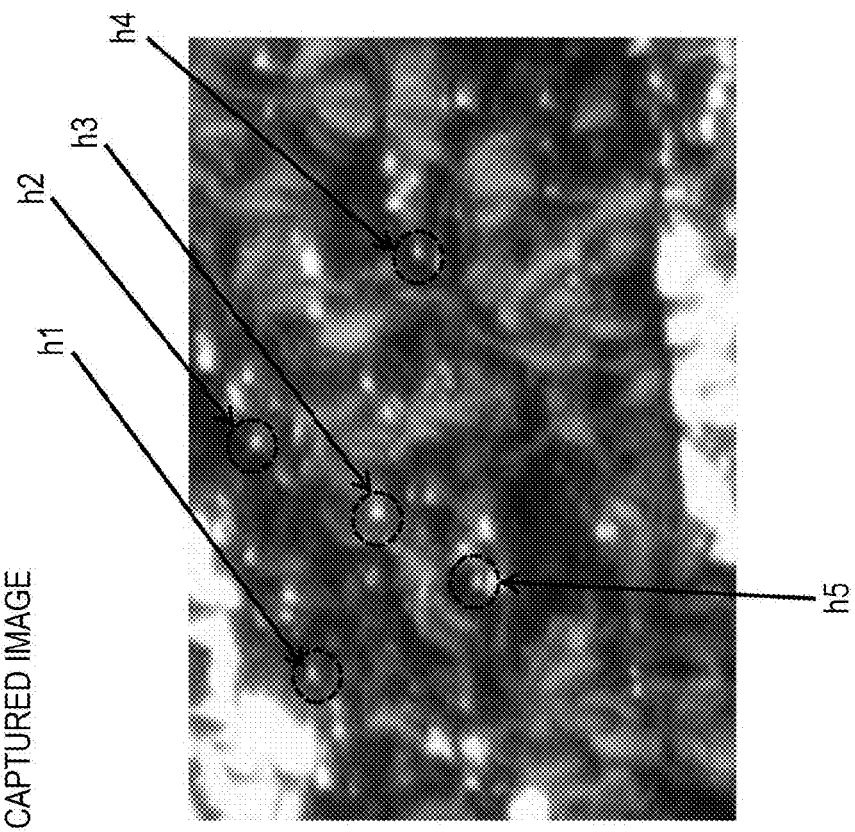
FIG. 1 is a diagram illustrating occurrence of a bright false color occurring in a highlighted region.
Figure 3:
FIGS. 3(a) and 3(b) are diagrams illustrating highlighted regions where a brightness false color occurs.

As described with reference to FIGS. 3(*a*) and 3(*b*), the brightness false color occurs such that, as illustrated in FIG. 3(*a*), when the pixels of the local region, that is, the highlighted region that is the high brightness region of about several pixels are only the W pixels and the G pixels, the pixel values of the G pixels become relatively larger than the pixel values of the peripheral R pixels and B pixels, and as a result, the color balance is lost, and the region is colored to green.

Further, as illustrated in FIG. 3(*b*), when the pixels of the highlighted region are configured from the W pixel, the R pixel, and the B pixel, the pixel values of the R pixel and the B pixel become relatively larger than the pixel values of the peripheral G pixels. As a result, the color balance is lost, and the region is colored to magenta. In this way, various patterns of false colors, that is, the brightness false colors occur depending on the configuration of the pixels included in the highlighted region that is the high brightness portion.

Hereinafter, processing of detecting the green false color occurring when the pixels of the highlighted region are only the W pixels and the G pixels, as illustrated in FIG. 3(*a*) will be described as an example.

Figure 7:
FIGS. 7(a) to 7(c) are diagrams illustrating highlighted regions where a brightness false color occurs.

FIGS. 7(*a*) to 7(*c*) illustrate configuration examples of the highlighted regions where the green false color occurs, similarly to FIG. 3(*a*). The regions surrounded by the dotted line circles illustrate the highlighted regions.

The false color detection unit 201 inputs the input pixel unit (7×7 pixels) having the pixel of interest as a center, the pixel being to be processed of the pixel value conversion (re-mosaic processing) in the data conversion processing unit 200, and determines whether the pixel of interest is included in the highlighted region, that is, whether the pixel of interest is the brightness false color pixel.

FIGS. 7(*a*) to 7(*c*) illustrate examples of when the pixel of interest is included in the highlighted region, that is, the pixel of interest is the brightness false color pixel. The highlighted regions surrounded by the dotted line circles in FIGS. 7(*a*) to 7(*c*) are configured from almost the G pixels and the W pixels.

Examples of processing of the false color detection unit 201 will be described with reference to FIGS. 8(1*a*) to 8(1*c*).

The examples of processing illustrated in FIGS. 8(1*a*) to 8(1*c*) and FIGS. 9(2*a*) to 9(2*c*) are examples of processing of when the central pixel (pixel of interest) of the input pixel unit (7×7 pixels) is a W pixel (W4), and a left adjacent pixel and a lower adjacent pixel of the central pixel (W4) are the G pixels.

When the input pixel unit has such an array, the false color detection unit 201 determines whether the central pixel (pixel of interest) is the brightness false color pixel that causes the green false color to occur by the processing illustrated in FIGS. 8(1*a*) to 8(1*c*) and FIGS. 9(2*a*) to 9(2*c*).

First, as illustrated in FIG. 8(1*a*), when the G pixels are positioned to the left of and below the central W pixel (W4), the false color detection unit 201 obtains out_up, in_up, in_dn, and out_dn according to the expressions (Expression 2a) to (Expression 2d) below. Note that W0 to W11 represent the pixel values of the W pixels illustrated in FIGS. 8(1*a*) to 8(1*c*).

$$\text{out\_up} = (W0 + 2 \times W1 + W2)/4 \quad \text{(Expression 2a)}$$

$$\text{in\_up} = (W3 + 2 \times W4 + W5)/4 \quad \text{(Expression 2b)}$$

$$\text{in\_dn} = (W6 + 2 \times W7 + W8)/4 \quad \text{(Expression 2c)}$$

$$\text{out\_dn} = (W9 + 2 \times W10 + W11)/4 \quad \text{(Expression 2d)}$$

Note that, here, all of out_up, in_up, in_dn, and out_dn are W pixel low-frequency signals generated with an average value or weight adding of the pixel values of a plurality of W pixels in a diagonally lower right direction in the reference region that is the input pixel unit of the 7×7 pixels.

That is, out_up, in_up, in_dn, and out_dn are the W pixel low-frequency signals corresponding to diagonally lower right direction lines.

In the present processing example, all of out_up, in_up, in_dn, and out_dn are values obtained such that the pixel values of three W pixels in the diagonally lower right direction are weight added at a ratio of 1:2:1.

in_up and in_dn are the W pixel low-frequency signals based on three W pixels of each of two diagonally lower right lines [an upper side line (in_up) and a lower side line (in_dn)] closest to the center of the reference region.

out_up is the W pixel low-frequency signal based on three W pixels in a diagonally lower right line adjacent to in_up in an upper direction.

out_dn is the W pixel low-frequency signal based on three W pixels in a diagonally lower right line adjacent to in_dn in a lower direction.

Among these four calculated values out_up, in_up, in_dn, and out_dn, when the value of in_up or in_dn, which is one of the two calculated values close to the central position of the reference region, is large, and the value of out_up or out_dn, which is one of the two calculated values separated from the center, is small, the false color detection unit 201 determines that the G pixels in the vicinity of the center are included in the highlighted region, and a possibility of occurrence of the false color is high.

To be specific, from the four W pixel low-frequency signals out_up, in_up, in_dn, and out_dn in the diagonally lower right lines, a maximum value max(in_up, in_dn) of the two W pixel low-frequency signals in_up and in_dn close to the center, a maximum value max(out_up, out_dn) of the two W pixel low-frequency signals out_up and out_dn separated from the center, and a difference value Diff1 between these two maximum values are calculated.

That is, the difference value Diff1 of the W pixels in a diagonally upper right direction perpendicular to the four diagonally lower right lines is calculated, and when the difference value satisfies an (Expression 3) below, the false color detection unit 201 determines that a possibility of the pixel of interest being the false color occurring pixel is high, and when the difference value does not satisfy the (Expression 3), the false color detection unit 201 determines that the pixel of interest is not the false color occurring pixel.

$$\text{Diff1} = \max(\text{in\_up}, \text{in\_dn}) - \max(\text{out\_up}, \text{out\_dn})$$
$$\text{Diff1} > \text{Thr1} \quad \text{(Expression 3)}$$

Note that, in the (Expression 3), max(A, B) is a function that returns a larger value of A and B, and Thr1 is a threshold.

Note that the threshold Thr1 may be a fixed value, a value that can be set by the user, or an automatically calculated value.

FIG. 8(1b) illustrates a corresponding example of out_up, in_up, in_dn, and out_dn, and the threshold Thr1 of when the false color detection unit 201 determines that the possibility of the pixel of interest being the false color occurring pixel is high.

FIG. 8(1c) illustrates a corresponding example of out_up, in_up, in_dn, and out_dn, and the threshold Thr1 of when the false color detection unit 201 determines that the pixel of interest is not the false color occurring pixel.

When the difference value satisfies the (Expression 3) described above, that is, the difference value satisfies the following (Expression 3):

$$\text{Diff1} > \text{Thr1} \quad \text{(Expression 3)}$$

the false color detection unit 201 further performs determination processing using the pixel values of the W pixels in the diagonally lower right direction of the reference region.

Determination processing using the pixel values of the W pixels in the diagonally lower right direction of the reference region will be described with reference to FIGS. 9(2a) to 9(2c).

FIG. 9(2a) illustrates the reference region of 7×7 pixels in which the G pixels are positioned to the left of and below the central W pixel (W4), similarly to FIG. 8(1a).

As illustrated in FIG. 9(2a), when the G pixels are positioned to the left of and below the central W pixel (W4), the false color detection unit 201 obtains out_up, in_up, center, in_dn, and out_dn according to the following expressions (Expression 4a) to (Expression 4e). Note that W0 to W9 represent pixel values of the W pixels illustrated in FIG. 9(2a).

$$\text{out\_up} = (W0 + W1)/2 \quad \text{(Expression 4a)}$$

$$\text{in\_up} = (W2 + W3)/2 \quad \text{(Expression 4b)}$$

$$\text{center} = (W4 + W5)/2 \quad \text{(Expression 4c)}$$

$$\text{in\_dn} = (W6 + W7)/2 \quad \text{(Expression 4d)}$$

$$\text{out\_dn} = (W8 + W9)/2 \quad \text{(Expression 4e)}$$

Note that, where, all of out_up, in_up, center, in_dn, and out_dn are W pixel low-frequency signals calculated with an average value or weight adding of pixel values of a plurality of W pixels in the diagonally upper right direction in the reference region.

In the present processing example, out_up, in_up, center, in_dn, and out_dn are values obtained such that the pixel values of two W pixels in the diagonally upper right direction are weight added at a ratio of 1:1.

center is the W pixel low-frequency signal based on two W pixels in a diagonally upper right line closest to the G pixels in the vicinity of the center of the reference region.

in_up is the W pixel low-frequency signal based on two W pixels in a diagonally upper right line adjacent to center in an upper direction.

in_dn is the W pixel low-frequency signal based on two W pixels in a diagonally upper right line adjacent to center in a lower direction.

out_up is the W pixel low-frequency signal based on two W pixels in a diagonally upper right line adjacent to in_up in an upper direction.

out_dn is the W pixel low-frequency signal based on two W pixels in a diagonally upper right line adjacent to in_dn in a lower direction.

Among these five calculated values out_up, in_up, center, in_dn, and out_dn, when the value of in_up, in_dn, or center, which is one of the three calculated values close to the center position of the reference region, is large, and a difference between the above value and the value of out_up or out_dn, which is one of the two calculated values separated from the center, is large, the false color detection unit 201 determines that the G pixels in the vicinity of the center are included in the highlighted region, and a possibility of occurrence of a false color is high.

To be specific, from the five W pixel low-frequency signals out_up, in_up, center, in_dn, and out_dn in the diagonally upper right lines, a maximum value max(in_up, center, in_dn) of the three W pixel low-frequency signals in_up, center, and in_dn close to the center, a maximum value max(out_up, out_dn) of the two W pixel low-frequency signals out_up and out_dn separated from the center, and a maximum difference value Diff2 between these two maximum values are calculated.

That is, the difference value Diff2 of the W pixels in the diagonally lower right direction perpendicular to the five diagonally upper right lines is calculated, and when the difference value satisfies an (Expression 5) described below, the false color detection unit 201 determines that a possibility of the pixel of interest being the false color occurring pixel is high, and when the difference value does not satisfy the (Expression 5), the false color detection unit 201 determines that the pixel of interest is not the false color occurring pixel.

$$\text{Diff2} = \max(\text{in\_up}, \text{center}, \text{in\_dn}) - \max(\text{out\_up}, \text{out\_dn})$$
$$\text{Diff2} > \text{Thr2} \quad \text{(Expression 5)}$$

Note that, in the (Expression 5), max(A, B, C) is a function that returns a largest value among A, B, and C, and Thr2 is a threshold.

Note that the threshold Thr2 may be a fixed value, may be a value that can be set by the user, or may be automatically calculated.

FIG. 9(2b) illustrates a corresponding example of out_up, in_up, center, in_dn, and out_dn, and the threshold Thr2 of when the false color detection unit 201 determines that the possibility of the pixel of interest being the false color occurring pixel is high.

FIG. 9(2c) illustrates a corresponding example of out_up, in_up, center, in_dn, and out_dn, and the threshold Thr2 of when the false color detection unit 201 determines that the pixel of interest is not the false color occurring pixel.

Finally, the false color detection unit 201 determines that, the pixel of interest is the false color occurring pixel when the difference value satisfies both of the two determination expressions of the (Expression 3) and the (Expression 5), and the pixel of interest is not the false color occurring pixel when the difference value does not satisfy either one of them.

That is, the false color detection unit 201 determines that the pixel of interest is the false color occurring pixel only when the difference value satisfies both of the following two determination expressions:

$$\text{Diff1} > \text{Thr1} \quad \text{(Expression 3)}$$

$$\text{Diff2} > \text{Thr2} \quad \text{(Expression 5)}$$

The determination result is output to the low-band signal calculation unit 202.

The false color determination processing described with reference to FIGS. 8(1*a*) to 8(1*c*) and FIGS. 9(2*a*) to 9(2*c*) is processing of when the central pixel (pixel of interest) of the 7×7 pixels that is the input pixel unit is the W pixel and the G pixels are adjacent to the left of and below the central W pixel.

Next, an example of the false color determination processing of when the central pixel (pixel of interest) of the 7×7 pixels that is the input pixel unit is the W pixel and the G pixels are adjacent to the right and above the central W pixel will be described.

Figure 10:
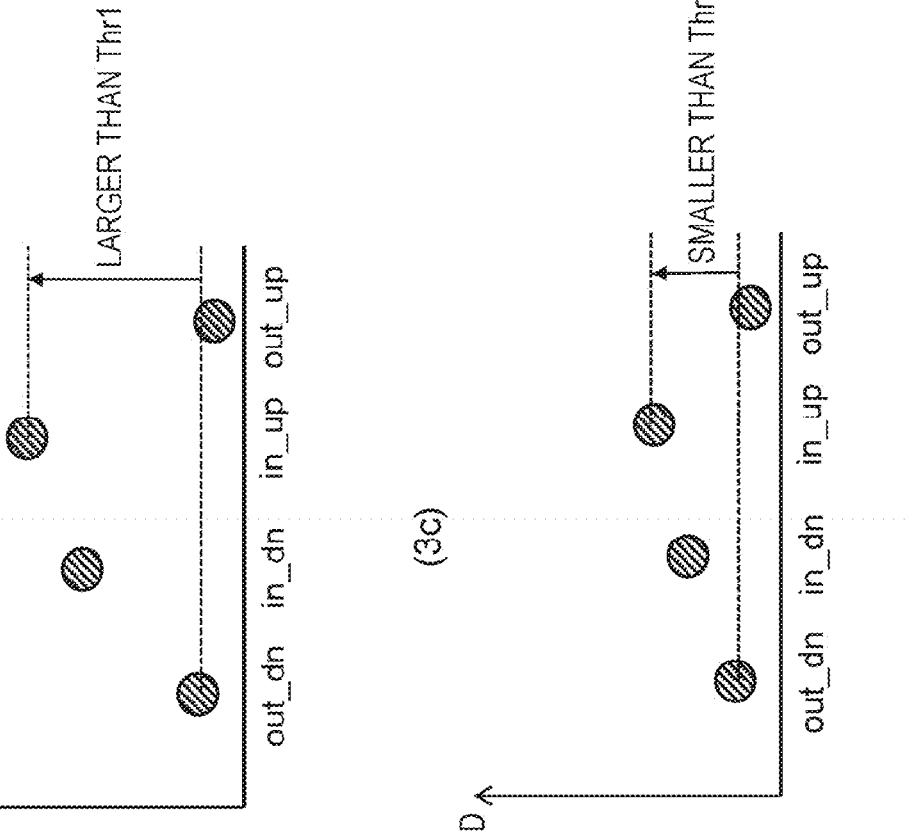
FIGS. 10(3a) to 10(3c) are diagrams illustrating processing executed by the false color detection unit of the image processing device of the present disclosure.

The false color detection unit 201 obtains, as illustrated in FIG. 10(3*a*), out_up, in_up, in_dn, and out_dn when the central pixel pixel of the input pixel unit is a W pixel (W7), and the G pixels are adjacent to the right of and above the central W pixel according to the following expressions (Expression 6a) to (Expression 6d). Note that W0 to W11 represent the pixel values of the W pixels illustrated in FIG. 10(3*a*).

$$\text{out\_up} = (W0 + 2 \times W1 + W2)/4 \quad \text{(Expression 6a)}$$

$$\text{in\_up} = (W3 + 2 \times W4 + W5)/4 \quad \text{(Expression 6b)}$$

$$\text{in\_dn} = (W6 + 2 \times W7 + W8)/4 \quad \text{(Expression 6c)}$$

$$\text{out\_dn} = (W9 + 2 \times W10 + W11)/4 \quad \text{(Expression 6d)}$$

The above expressions are similar to the (Expression 2a) to (Expression 2d) described with reference to FIGS. 8(1*a*) to 8(1*c*), all of out_up, in_up, in_dn, and out_dn are W pixel low-frequency signal based on pixel values of a plurality of W pixels in the diagonally lower right direction in the reference region.

In the present processing example, these W pixel low-frequency signals are values obtained such that the pixel values of three W pixels in the diagonally lower right direction are weight added at a ratio of 1:2:1.

in_up and in_dn are the W pixel low-frequency signals based on three pixels in each of two diagonally lower right lines [an upper side line (in_up) and a lower side line (in_dn)] closest to the center of the reference region.

out_up is the W pixel low-frequency signal based on three W pixels in a diagonally lower right line adjacent to in_up in an upper direction.

out_dn is the W pixel low-frequency signal based on three W pixels in a diagonally lower right line adjacent to in_dn in a lower direction.

Among these four calculated values out_up, in_up, in_dn, and out_dn, when the value of in_up or in_dn, which is one of the two calculated values close to the central position of the reference region, is large, and the value of out_up or out_dn, that is one of the two calculated values separated from the center, is small, the false color detection unit 201 determines that the G pixels in the vicinity of the center are included in the highlighted region, and a possibility of occurrence of a false color is high.

To be specific, similarly to the processing described with reference to FIGS. 8(1*a*) to 8(1*c*), from the four W pixel low-frequency signals out_up, in_up, in_dn, and out_dn in the diagonally lower right lines, a maximum value max(in_up, in_dn) of the two W pixel low-frequency signals in_up and in_dn close to the center, a maximum value max(out_up, out_dn) of the two W pixel low-frequency signals out_up and out_dn distant from the enter, and a difference value Diff1 between these two maximum values are calculated.

That is, the difference value Diff1 of the W pixels in the diagonally upper right direction perpendicular to the four diagonally lower right lines is calculated, and when the difference value satisfies the following (Expression 7), false color detection unit 201 determines that a possibility of the pixel of interest being the false color occurring pixel is high, and when the difference value does not satisfy the (Expression 7), the false color detection unit 201 determines that the pixel of interest is not the false color occurring pixel.

$$\text{Diff1} = \max(\text{in\_up}, \text{in\_dn}) - \max(\text{out\_up}, \text{out\_dn})$$
$$\text{Diff1} > \text{Thr1} \quad \text{(Expression 7)}$$

Note that, in the (Expression 7), max(A, B) is a function that returns a larger value of A and B, and Thr1 is a threshold.

FIG. 10(3*b*) illustrates a corresponding example of out_up, in_up, in_dn, and out_dn, and the threshold Thr1 of when the false color detection unit 201 determines that a possibility of the pixel of interest being the false color occurring pixel is high.

FIG. 10(3*c*) illustrates a corresponding example of out_up, in_up, in_dn, and out_dn, and the threshold Thr1 of when the false color detection unit 201 determines that the pixel of interest is not the false color occurring pixel.

When the difference value satisfies the (Expression 7) described above, that is, the difference value satisfies the following (Expression 7):

$$\text{Diff1} > \text{Thr1} \quad \text{(Expression 7)}$$

the false color detection unit 201 further performs determination processing using the pixel values of the W pixels in the diagonally lower right direction of the reference region.

Determination processing using the pixel values of the W pixels in the diagonally lower right direction of the reference region will be described with reference to FIGS. 11(4*a*) to 11(4*c*).

Figure 11:
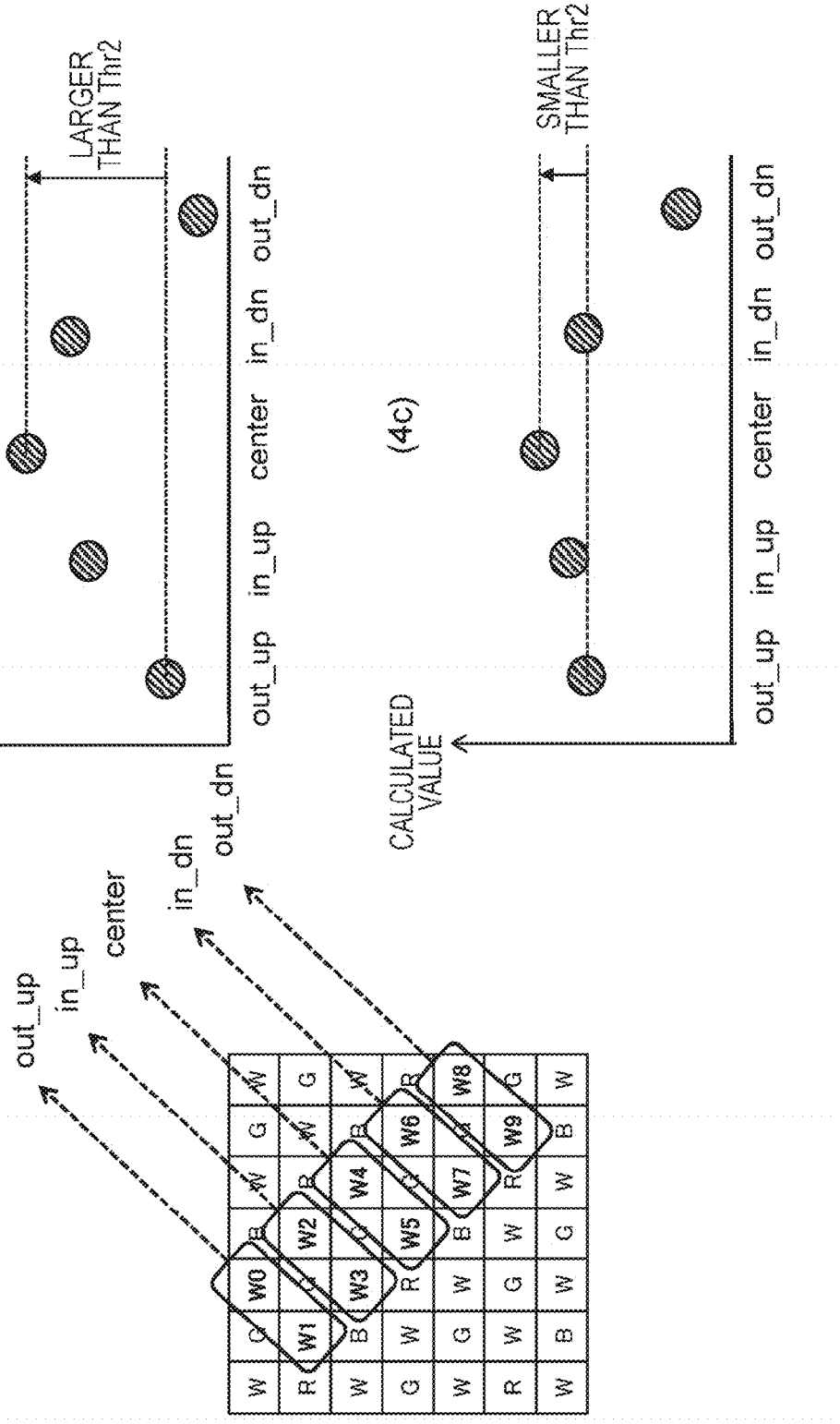
FIGS. 11(4a) to 11(4c) are diagrams illustrating processing executed by the false color detection unit of the image processing device of the present disclosure.
Figure 12:
FIGS. 12(a) to 12(e) are diagrams illustrating processing executed by the false color detection unit of the image processing device of the present disclosure.

FIG. 11(4*a*) illustrates, similarly to FIG. 10(3*a*), the reference region of 7×7 pixels in which the G pixels are positioned to the right of and above a central W pixel (W5).

The false color detection unit 201 obtains, as illustrated in FIG. 11(4*a*), out_up, in_up, center, in_dn, and out_dn when the G pixels are positioned to the left of and below the central W pixel (W5) according to the following expressions (Expression 8a) to (Expression 8e). Note that W0 to W9 represent the pixel values of the W pixels illustrated in FIG. 11(4*a*).

$$\text{out\_up} = (W0 + W1)/2 \quad \text{(Expression 8a)}$$

$$\text{in\_up} = (W2 + W3)/2 \quad \text{(Expression 8b)}$$

$$\text{center} = (W4 + W5)/2 \quad \text{(Expression 8c)}$$

$$\text{in\_dn} = (W6 + W7)/2 \quad \text{(Expression 8d)}$$

$$\text{out\_dn} = (W8 + W9)/2 \quad \text{(Expression 8e)}$$

Note that, here, all of out_up, in_up, center, in_dn, and out_dn are W pixel low-frequency signals based on pixel values of a plurality of W pixels in the diagonally upper right direction in the reference region.

In the present processing example, the W pixel low-frequency signals are values obtained such that the pixel values of two W pixels in the diagonally upper right direction are weight added at a ratio of 1:1.

center is the W pixel low-frequency signal based on two W pixels in a diagonally upper right lines closest to the G pixels in the vicinity of the center of the reference region.

in_up is the W pixel low-frequency signal based on two W pixels in a diagonally upper right line adjacent to center in an upper direction.

in_dn is the W pixel low-frequency signal based on two W pixels in a diagonally upper right line adjacent to center in a lower direction.

out_up is the W pixel low-frequency signal based on two W pixels in a diagonally upper right line adjacent to in_up in an upper direction.

out_dn is the W pixel low-frequency signal based on two W pixels in a diagonally upper right line adjacent to in_dn in a lower direction.

Among these five calculated values out_up, in_up, center, in_dn, and out_dn, when the value of in_up, in_dn, or center, which is one of the three calculated values close to the central position of the reference region, is large, and a difference between the above value and the value of out_up or out_dn, which is one of the two calculated values separated from the center, is large, the false color detection unit 201 determines that the G pixels in the vicinity of the center are included in the highlighted region, and a possibility of occurrence of a false color is high.

To be specific, from the five W pixel low-frequency signal out_up, in_up, center, in_dn, and out_dn in the diagonally upper right lines, a maximum value max(in_up, center, in_dn) of the three W pixel low-frequency signals in_up, center, and in_dn close to the center, a maximum value max(out_up, out_dn) of the two W pixel low-frequency signals out_up and out_dn distant from the center, and a difference value Diff2 between these two maximum values are calculated.

That is, the difference value Diff2 of the W pixels in the diagonally lower right direction perpendicular to the five diagonally upper right lines is calculated, and when the difference value satisfies the following (Expression 9), the false color detection unit 201 determines that a possibility of the pixel of interest being the false color occurring pixel is high, and when the difference value does not satisfy the (Expression 9), the false color detection unit 201 determines that the pixel of interest is not the false color occurring pixel.

$$Diff2 = max(in\_up, center, in\_dn) - max(out\_up, out\_dn)$$
$$Diff2 > Thr2 \quad \text{(Expression 9)}$$

Note that, in the (Expression 9), max(A, B, C) is a function that returns a maximum value of A, B, and C, and Thr2 is a threshold.

FIG. 11(4b) illustrates a corresponding example of out_up, in_up, center, in_dn, and out_dn, and the threshold Thr2 of when the false color detection unit 201 determines that a possibility of the pixel of interest being the false color occurring pixel is high.

FIG. 11(4c) illustrates a corresponding example of out_up, in_up, center, in_dn, and out_dn, and the threshold Thr2 of when the false color detection unit 201 determines that the pixel of interest is not the false color occurring pixel.

Finally, the false color detection unit 201 determines that the pixel of interest is the false color occurring pixel when the difference value satisfies both of the two determination expressions of the (Expression 7) and the (Expression 9), and the pixel of interest is not the false color occurring pixel when the difference value does not satisfy either one of them.

That is, the false color detection unit 201 determines that the pixel of interest is the false color occurring pixel only when the difference value satisfies the following two determination expressions:

$$Diff1 > Thr1 \quad \text{(Expression 7)}$$

$$Diff2 > Thr2 \quad \text{(Expression 9)}$$

The determination result is output to the low-band signal calculation unit 202.

As examples of the processing executed by the false color detection unit 201, processing examples of determining whether the green brightness false color has occurred when (A) the central pixel is the W pixel, and the G pixels are adjacent to the left of and below the central W pixel (FIGS. 8(1a) to 8(1c) and FIGS. 9(2a) to 9(2c)), and (B) the central pixel is the W pixel, and the G pixels are adjacent to the right of and above the central W pixel (FIGS. 10(3a) to 10(3c) and FIGS. 11(4a) to 11(4c))

have been described.

There are various other types of setting for the setting of the input pixel unit, and even in a case of the various other types of setting, the false color detection unit 201 basically executes similar processing, that is, determination processing based on the following two types of comparison processing:

(1) comparison processing between the difference value Diff1 calculated based on the pixel values of the plurality of W pixels in the diagonally lower right lines and the threshold Thr1, and (2) comparison processing between the difference value Diff2 calculated based on the pixel values of the plurality of W pixels in the diagonally upper right lines and the threshold Thr2.

As comparison results of these two types of comparison, when the difference value is larger than the threshold, the false color detection unit 201 determines that the pixel of interest is the brightness false color pixel.

The false color detection unit 201 executes these pieces of determination processing, and outputs the determination results to the low-band signal calculation unit 202.

Next, processing of detecting a green false color occurring when the pixels of the highlighted region are almost the W, R, and B pixels only, as illustrated in FIG. 3(b), will be described. As illustrated in FIG. 3(b), when the pixels of the highlighted region are configured from the W pixel, R pixel, and B pixel, the pixel values of the R pixel and the B pixel becomes relatively larger than the pixel values of the peripheral G pixels. As a result, the color balance is lost, and the region is colored to magenta.

FIGS. 12(a) to 12(e) illustrate configuration examples of the highlighted regions where a magenta false color occurs, similarly to FIG. 3(b). The regions surrounded by the dotted line circles represent the highlighted regions.

Processing examples of the false color detection unit 201 will be described with reference to FIGS. 13(5a) to 13(5c).

Figure 13:
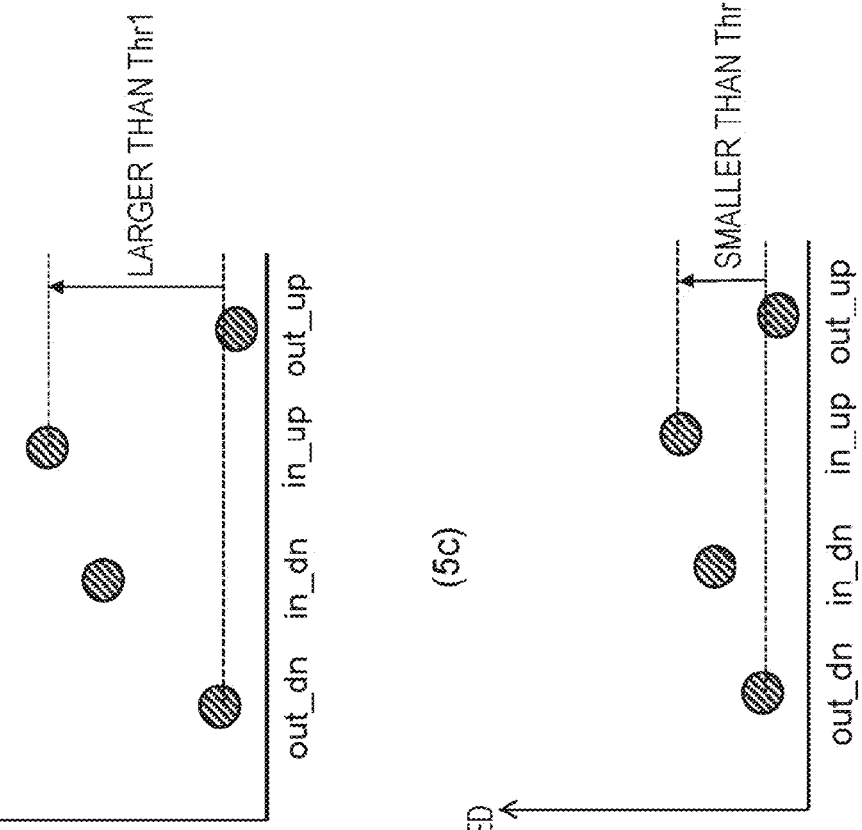
FIGS. 13(5a) to 13(5c) are diagrams illustrating processing executed by the false color detection unit of the image processing device of the present disclosure.
Figure 14:
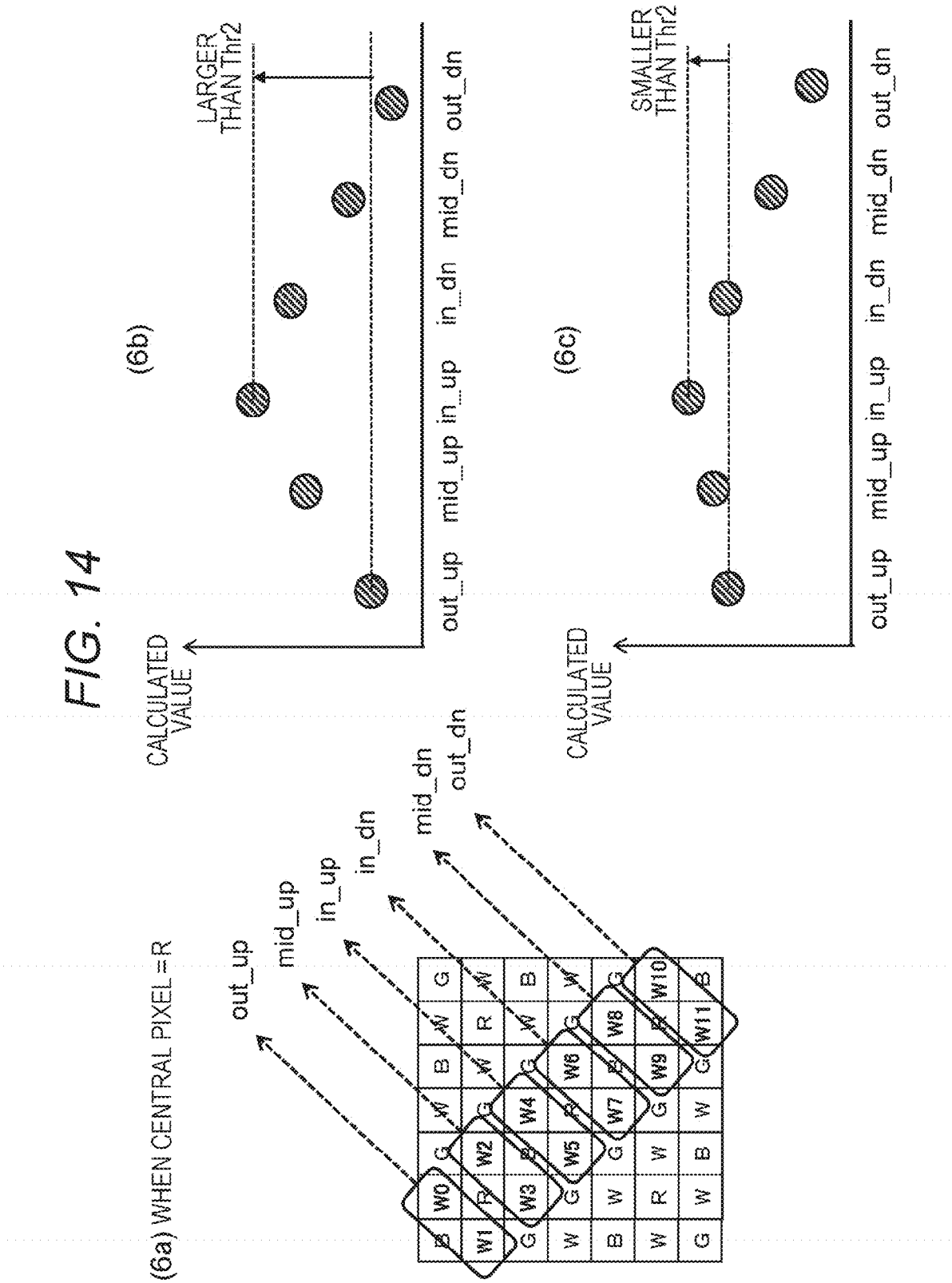
FIGS. 14(6a) to 14(6c) are diagrams illustrating processing executed by the false color detection unit of the image processing device of the present disclosure.

The processing examples illustrated in FIGS. 13(5a) to 13(5c) and FIGS. 14(6a) to 14(6c) are processing examples of when the central pixel (pixel of interest) of the input pixel unit (7×7 pixels) is the R pixel.

FIGS. 13(5a) to 13(5c) illustrates examples of comparison processing between the difference value Diff1 calculated based on the pixel value of a plurality of W pixels in diagonally lower right lines and the threshold Thr1, and FIGS. 14(6a) to 14(6c) illustrates examples of comparison processing between the difference value Diff2 calculated based on the pixel values of a plurality of W pixels in diagonally upper right lines and the threshold Thr2.

The examples illustrated in FIGS. 13(5a) to 13(5c) are similar processing to the processing of FIGS. 8(1a) to 8(1c) and FIGS. 10(3a) to 10(3c) described above. However, a difference is that the center of the input pixel unit is the R pixel.

A plurality of diagonally lower right lines from a position close to the reference region is set, low-frequency signals of W pixels, that is, W low-band signals of the W pixels are calculated using a plurality of W pixel values on the lines, and a difference value between a maximum W low-frequency signal value of the plurality of lines closer to the center and a maximum W low-frequency signal value of the plurality of lines distant from the center is calculated. That is, a difference value of the W pixels in the diagonally upper right direction perpendicular to the four diagonally lower right lines is calculated as Diff1. Further, the calculated difference value Diff1 and the threshold Thr1 set in advance are compared.

This processing is similar to the processing of [(Expression 2a) to (Expression 2d), and (Expression 3)] described with reference to FIGS. 8(1a) to 8(1c), and the processing of [(Expression 6a) to (Expression 6d), and (Expression 7)] described with reference to FIGS. 10(3a) to 10(3c).

When the difference value Diff1 is larger than the threshold Thr1 determined in advance, there is a possibility of the pixel of interest being the brightness false color pixel, and further, processing illustrated in FIGS. 14(6a) to 14(6c), that is, the comparison processing between the difference value Diff2 calculated based on the pixel values of the plurality of W pixels in the diagonally upper right lines and the threshold Thr2.

An example illustrated in FIGS. 14(6a) to 14(6c) is similar processing to the processing of FIGS. 9(2a) to 9(2c) and FIGS. 11(4a) to 11(4c) described above. However, a difference is that the center of the input pixel unit is the R pixel. Further, a difference is that six diagonally upper right lines are set and used.

When the R pixel is positioned in the center, as illustrated in FIG. 14(6), the false color detection unit 201 obtains out_up, in_up, center, in_dn, and out_dn according to the following expressions (Expression 10a) to (Expression 10f). Note that W0 to W11 represent the pixel values of the W pixels illustrated in FIG. 14(6a).

$$out\_up=(W0+W1)/2 \qquad \text{(Expression 10a)}$$

$$mid\_up=(W2+W3)/2 \qquad \text{(Expression 10b)}$$

$$in\_up=(W4+W5)/2 \qquad \text{(Expression 10c)}$$

$$in\_dn=(W6+W7)/2 \qquad \text{(Expression 10d)}$$

$$mid\_dn=(W8+W9)/2 \qquad \text{(Expression 10e)}$$

$$out\_dn=(W10+W11)/2 \qquad \text{(Expression 10f)}$$

Note that, here
all of out_up, mid-up, in_up, in_dn, mid_dn, and out_dn are W pixel low-frequency signals calculated with an average value and weight adding of the pixel values of a plurality of W pixels in the diagonally upper right direction in the reference region.

In the processing example, the W pixel low-frequency signals are obtained such that the pixel values of two W pixels in the diagonally upper right direction are weight added at a ratio of 1:1.

in_up is the W pixel low-frequency signal based on two W pixels in a diagonally upper right line adjacent to the central R pixel in an upper direction.

in_dn is the W pixel low-frequency signal based on two W pixels in a diagonally upper right line adjacent to the central R pixel in a lower direction.

mid-up is the W pixel low-frequency signal based on two W pixels in a diagonally upper right line adjacent to in_up in an upper direction.

mid_dn is the W pixel low-frequency signal based on two W pixels in a diagonally upper right line adjacent to in_dn in a lower direction.

out_up is the W pixel low-frequency signal based on two W pixels in a diagonally upper right line adjacent to mid-up in an upper direction.

out_dn is the W pixel low-frequency signal based on two W pixels in a diagonally upper right line adjacent to mid do in a lower direction.

Among these six calculated values out_up, mid-up, in_up, in_dn, mid_dn, and out_dn, when the value of mid-up, in_up, in_dn, or mid_dn, which is one of the four calculated values close to the central position of the reference region, and a difference between the value of the four calculated values and the value of out_up or out_dn, which is one of the two calculated values separated from the center, is large, the false color detection unit 201 determines that the R pixel in the vicinity of the center is included in the highlighted region, and a possibility of occurrence of a false color is high.

To be specific, from the six W pixel low-frequency signals out_up, mid-up, in_up, in_dn, mid_dn, and out_dn in the diagonally upper right lines,
a maximum value max(mid-up, in_up, in_dn, mid_dn) of the four W pixel low-frequency signals mid-up, in_up, in_dn, and mid_dn close to the center,
a maximum value max(out_up, out_dn) of the two W pixel low-frequency signals out_up, and out_dn distant from the center, and
a difference value Diff2 between these two maximum values
are calculated.

That is, the difference value Diff2 of the W pixels in the diagonally lower right direction perpendicular to the six diagonally upper right lines is calculated, and when the difference value satisfies the following (Expression 11), the false color detection unit 201 determines that a possibility of the pixel of interest being the false color occurring pixel is high, and when the difference value does not satisfy the (Expression 11), the false color detection unit 201 determines that the pixel of interest is not the false color occurring pixel.

$$Diff2=\max(mid\text{-}up,in\_up,in\_dn,mid\_dn)-\max(out\_up,out\_dn) \; Diff2>Thr2 \qquad \text{(Expression 11)}$$

Note that, in the (Expression 11),
max(A, B, C) is a function that returns a maximum value of A, B, and C, and
Thr2 is a threshold.

Note that the threshold Thr2 may be a fixed value, may be a value that can be set by the user, or may be automatically calculated.

FIG. 14(6b) illustrates a corresponding example of out_up, mid-up, in_up, in_dn, mid_dn, and out_dn, and the threshold Thr2 of when the false color detection unit 201 determines that a possibility of the pixel of interest being the false color occurring pixel is high.

FIG. 14(6*c*) illustrates a corresponding example of out_up, mid-up, in_up, in_dn, mid_dn, and out_dn, and the threshold Thr2 of when the false color detection unit 201 determines that the pixel of interest is not the false color occurring pixel.

As described above, the false color detection unit 201 determines whether the following determination expressions are satisfied according to the processing described with reference to FIGS. 13(5*a*) to 13(5*c*) and FIGS. 14(6*a*) to 14(6*c*).

Diff1>Thr1
Diff2>Thr2

Only when the above two determination expressions are satisfied, the false color detection unit 201 determines that the pixel of interest is the false color occurring pixel.

The determination result is output to the low-band signal calculation unit 202.

Figure 15:
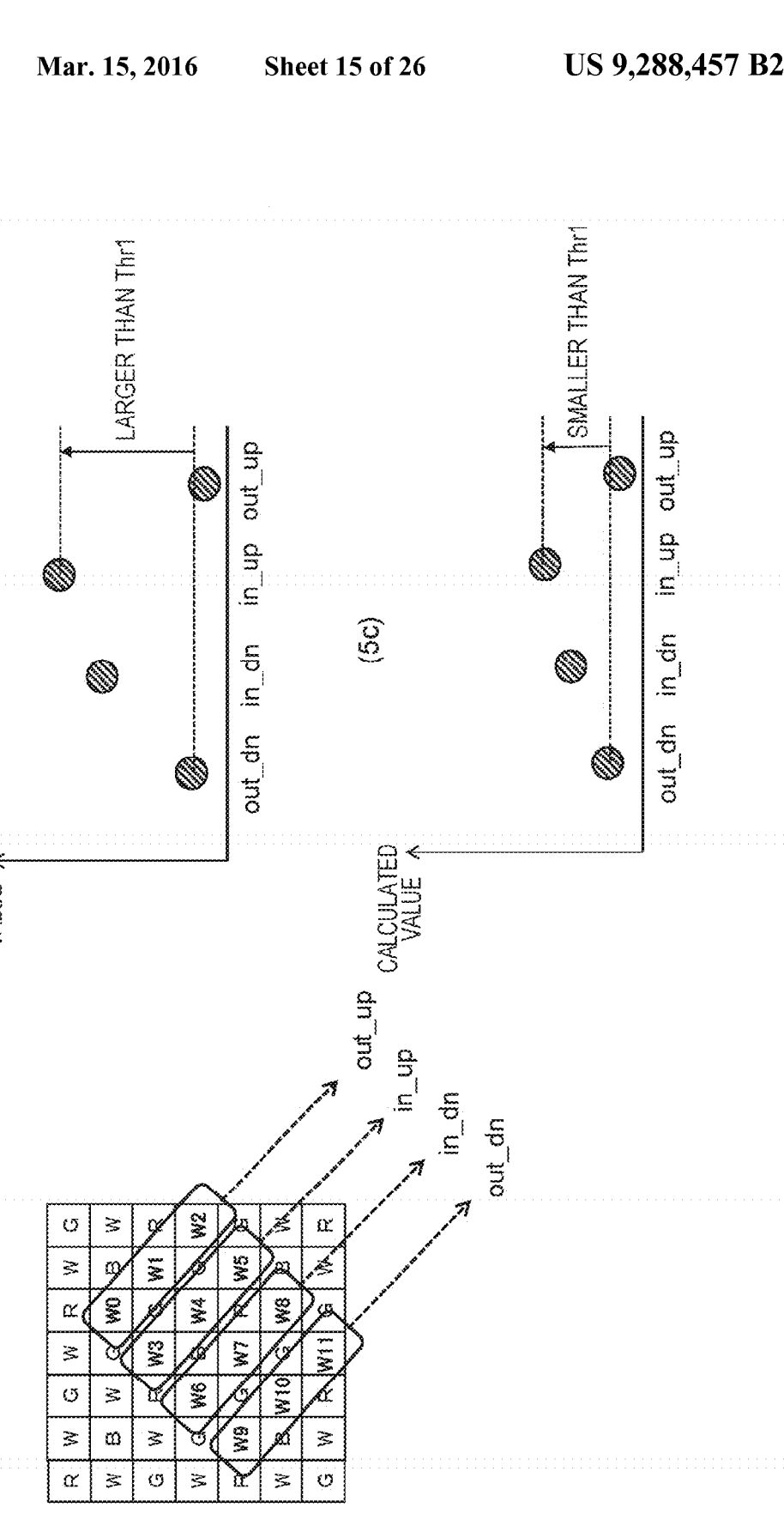
FIGS. 15(5a) to 15(5c) are diagrams illustrating processing executed by the false color detection unit of the image processing device of the present disclosure.
Figure 16:
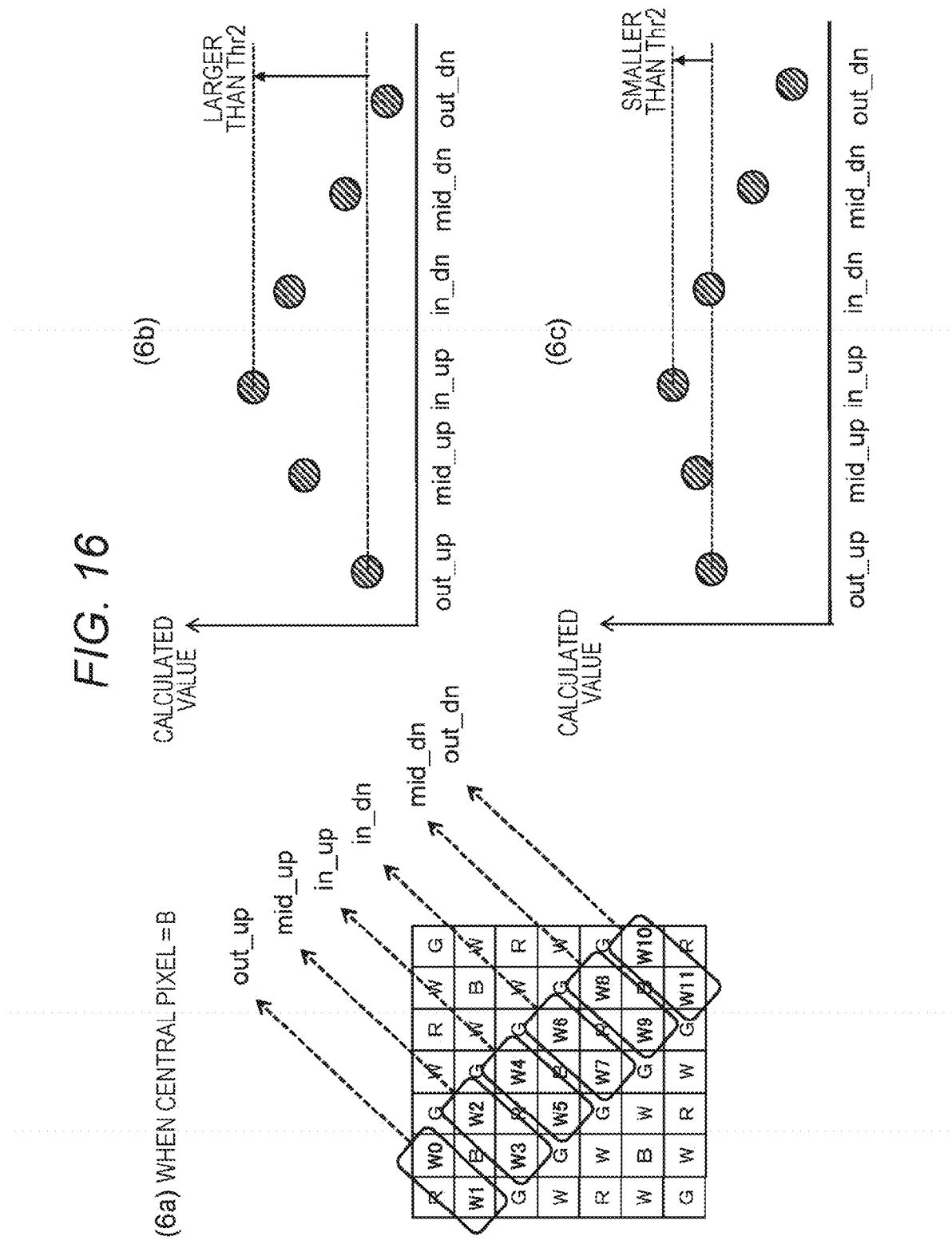
FIGS. 16(6a) to 16(6c) are diagrams illustrating processing executed by the false color detection unit of the image processing device of the present disclosure.

FIGS. 15(5*a*) to 15(5*c*) and FIGS. 16(6*a*) to 16(6*c*) illustrate processing examples of when the central pixel is the B pixel.

FIGS. 15(5*a*) to 15(5*c*) illustrate examples of comparison processing between the difference value Diff1 calculated based on the pixel values of a plurality of W pixels in the diagonally lower right lines and the threshold Thr1, and FIGS. 16(6*a*) to 16(6*c*) illustrate examples of comparison processing between the difference value Diff2 calculated based on the pixel values of a plurality of W pixels in the diagonally upper right lines and the threshold Thr2.

These pieces of processing are similar to the processing described with reference to FIGS. 13(5*a*) to 13(5*c*) and FIGS. 14(6*a*) to 14(6*c*) except that the central pixel is replaced with the B pixel.

As described above, even when the central pixel is the R pixel or the B pixel, the false color detection unit 201 determines whether both of the following two expressions are satisfied:

Diff1>Thr1
Diff2>Thr2

When the expressions are satisfied, the false color detection unit 201 determines that the pixel of interest is the brightness false color pixel.

When at least one of the above two expressions is not satisfied, the false color detection unit 201 determines that the pixel of interest is not the brightness false color pixel, and outputs the determination result to the low-band signal calculation unit 202.

As described above, the false color detection unit 201 executes the determination processing based on the following two pieces of comparison processing.

(1) The W pixel low-frequency component signals corresponding to respective lines are calculated based on the pixel values of the plurality of W pixels in the plurality of diagonally lower right lines set in the vicinity of the pixel of interest, and the comparison processing between the difference value Diff1 between the maximum value of the W pixel low-frequency component signals in the plurality of inner-side lines close to the pixel of interest, and the maximum value of the W pixel low-frequency component signals in the plurality of outer-side lines distant from the pixel of interest, and the threshold Thr1 is performed, and (2) the W pixel low-frequency component signals corresponding to respective lines are calculated based on the pixel values of the plurality of W pixels of the plurality of diagonally upper right lines set to the vicinity of the pixel of interest, and the comparison processing between the difference value Diff2 between the maximum value of the W pixel low-frequency signals in the plurality of inner-side lines close to the pixel of interest and the maximum value of the W pixel low-frequency component signals in the plurality of outer-side lines distant from the pixel of interest, and the threshold Thr2 is performed.

As a result of these two pieces of comparison processing, when the difference value is larger than the threshold, the false color detection unit 201 determines that the pixel of interest is the brightness false color pixel.

The false color detection unit 201 executes these pieces of determination processing, and outputs the determination result to the low-band signal calculation unit 202.

Next, processing of the low-band signal calculation unit 202 will be described.

The low-band signal calculation unit 202 calculates a low-band signal (mR, mG, mB) of any of the R pixel, G pixel, and B pixel used in the pixel interpolation unit 203, and a low-band signal (mW) of the W pixel.

The low-band signal calculation unit 202 inputs the determination result indicating whether the pixel of interest to serve as an object to be interpolated in the pixel interpolation unit 203, that is, the pixel of interest in the center of the input unit pixels (7×7 pixels) is the brightness false color pixel, from the false color detection unit 201.

When having been input the determination result indicating that the pixel of interest is not the brightness false color pixel, from the false color detection unit 201, the low-band signal calculation unit 202 calculates the low-band signal using a first low-pass filter (LPF) coefficient determined in advance, that is, a normal LPF coefficient such that a pixel closer to the position of the pixel of interest, that is, a pixel closer to the center of the reference region has a larger coefficient.

Meanwhile, when having been input the determination result indicating that the pixel of interest is the brightness false color pixel, from the false color detection unit 201, the low-band signal calculation unit 202 calculates the low-band signal by applying a second low-pass filter (LPF) coefficient in which a correction effect of a false color is enhanced.

The second low-pass filter (LPF) coefficient is a coefficient such that a pixel close to the position of the pixel of interest as an object to be converted, that is, a pixel close to the center of the reference region as a 7×7 input pixel unit is set to have a small coefficient. This processing is processing for calculating an interpolation pixel value while suppressing influence of the pixel values in the highlighted region.

Performing of such processing suppresses the influence of the pixel values in the highlighted region, and enhances a decrease in a false color.

The low-band signal calculation unit 202 calculates the low-band signals mR, mG, mB, and mW with respect to respective RGBW signals. That is, the low-band signal calculation unit 202 selectively executes the following processing.

When the pixel of interest is determined to be the false color pixel, the low-band signal calculation unit 202 sets a pixel value contribution rate of the reference pixel in a region close to the pixel of interest to be low, and performs processing of calculating the low-band signal applying the low-pass filter (LPF) in which the pixel value contribution rate of the reference pixel in a peripheral region distant from the pixel of interest is set to be high.

When the pixel of interest is determined not to be the false color pixel, the low-band signal calculation unit 202 sets the pixel value contribution rate of the reference pixel in a region close to the pixel of interest to be high, and performs processing of calculating the low-band signal applying the low-pass filter (LPF) in which the pixel value contribution rate of the reference pixel in a peripheral region distant from the pixel of interest to be low.

Examples of the coefficients of the LPF will be described with reference to FIGS. 17(1*a*) to 17(1*c*).

The examples illustrated in FIGS. 17(1*a*) to 17(1*c*) are setting examples of the LPFs applied to the processing of calculating the low-band signal mG of a G signal of when the central pixel of the input pixel unit is the W pixel and the G pixels are positioned to the left of and below the central W pixel.

FIG. 17(1*a*) illustrates an example of the input pixel unit, and illustrates the G pixels applied to the processing of calculating the low-band signal mG of a G signal of when the central pixel is the W pixel, and the G pixels are positioned to the left of and below the central W pixel by thick frame.

FIG. 17(1*b*) illustrates a setting example of a first low-pass filter (LPF) coefficient of when the pixel of interest as the central pixel is determined not to be the false color pixel, that is, a normal LPF coefficient such that a pixel closer to the position of the pixel of interest, that is, a pixel closer to the center of the reference region has a larger coefficient.

FIG. 17(1*c*) illustrates a setting example of a second low-pass filter (LPF) coefficient of when the pixel of interest as the central pixel of the input pixel unit is determined to be the false color pixel, that is, an LPF coefficient in which a pixel closer to the position of the pixel of interest, that is, a pixel closer to the center of the reference region is set to have a smaller coefficient.

When the pixel of interest as the central pixel is determined not to be the false color pixel, a G low-band signal mG positioned at the pixel of interest is a value obtained such that the G pixel values of the twelve G pixels at respective pixel positions in the reference region illustrated in FIG. 17(1*a*) are multiplied by the coefficients (1/32 to 6/32) illustrated in FIG. 17(1*b*), and the multiplied values are added.

Meanwhile, when the pixel of interest as the central pixel is determined to be the false color pixel, the G low-band signal mG corresponding to the position of the pixel of interest is a value obtained such that the pixel values of the twelve G pixels at respective pixel positions in the reference regions illustrated in FIG. 17(1*a*) are multiplied by the coefficients (0/16 to 3/16) illustrated in FIG. 17(1*c*), and the multiplied values are added.

A substantially different point of the setting of the LPF coefficients between FIGS. 17(1*b*) and 17(1*c*) is coefficients with respect to the two G pixels close to the center. A large coefficient is set when the pixel of interest as the central pixel is determine not to be the false color pixel, and a small coefficient is set when the pixel of interest as the central pixel is determined to be the false color pixel.

With this processing, when the pixel of interest as the central pixel is determined not to be the false color pixel, the G low-band signal mG becomes a value to which the G pixel value close to the center of the reference region is reflected largely.

Meanwhile, when the pixel of interest as the central pixel is determined to be the false color pixel, the G low-band signal mG becomes a value in which reflection of the G pixel value close to the center of the reference region is zero or suppressed.

Note that the setting examples of the coefficients illustrated in FIGS. 17(1*a*) to 17(1*c*) are specific examples, and the coefficients may be set to other coefficients, as long as the LPF coefficients are set such that the pixel close to the center of the reference region has a large coefficient when the pixel of interest as the central pixel is determined not to be the false color pixel, and a pixel close to the center of the reference region has a small coefficient when the pixel of interest is determined to be the false color pixel.

Figure 18:
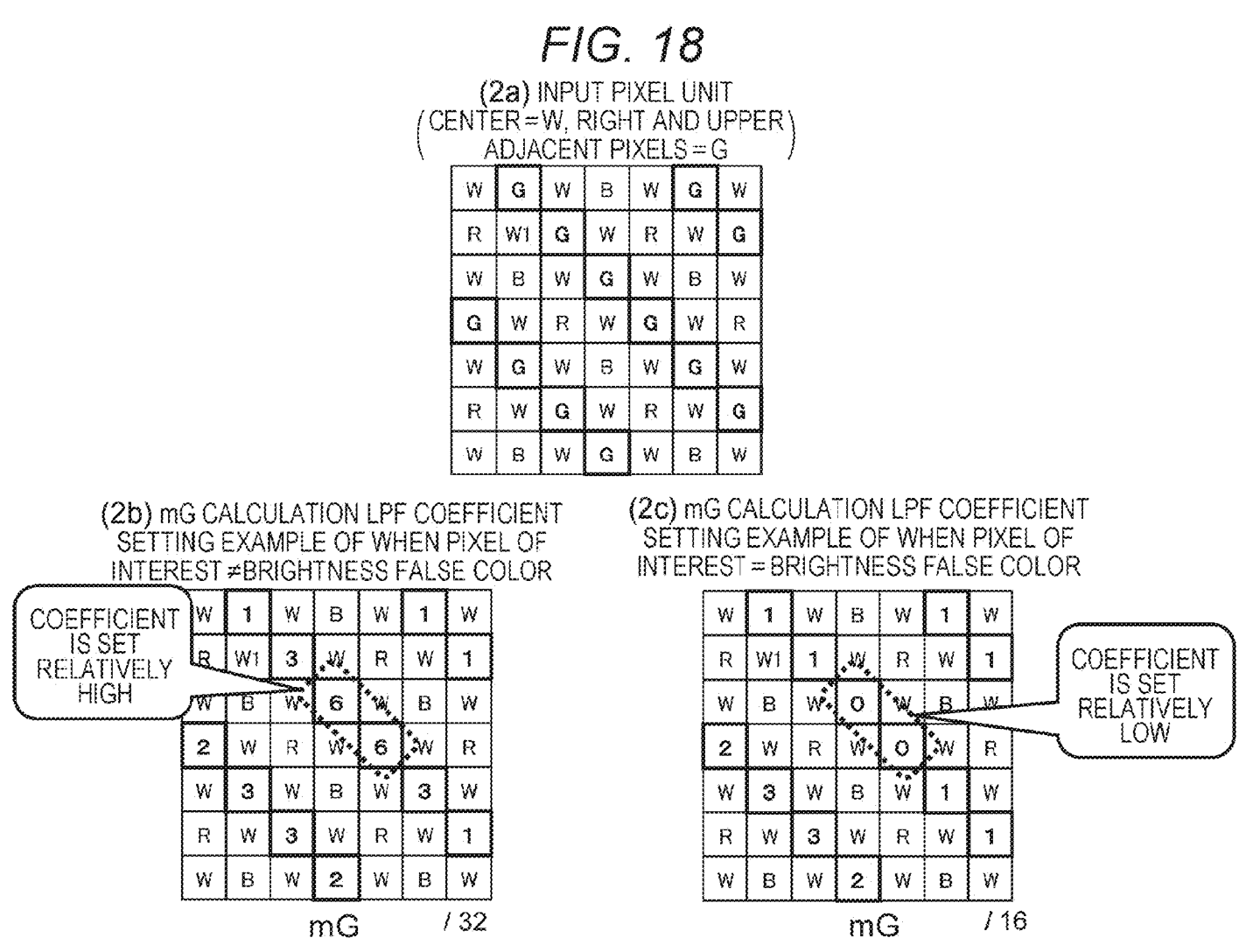

Examples illustrated in FIGS. 18(2*a*) to 18(2*c*) are setting examples of LPFs applied to the processing of calculating the low-band signal mG of the G signal of when the central pixel of the input pixel unit is the W pixel, and the G pixels are positioned to the right of and above the central W pixel.

FIG. 18(2*a*) illustrates an example of the input pixel unit, and illustrates the G pixels applied to the processing of calculating the low-band signal mG of the G signal of when the central pixel is the W pixel, and the G pixels are positioned to the right of and above the central W pixel, by thick frame.

FIG. 18(2*b*) illustrates a setting example of a first low-pass filter (LPF) coefficient of when the pixel of interest as the central pixel is determined not to be the false color pixel, that is, a normal LPF coefficient set such that a pixel closer to the position of the pixel of interest, that is, a pixel closer to the center of the reference region has a larger coefficient.

FIG. 18(2*c*) illustrates a setting example of a second low-pass filter (LPF) coefficient of when the pixel of interest as the central pixel of the input pixel unit is determined to be the false color pixel, that is, an LPF coefficient in which a pixel closer to the position of the pixel of interest, that is, a pixel closer to the center of the reference region is set to have a smaller coefficient.

When the pixel of interest as the central pixel is determined not to be the false color pixel, a G low-band signal mG positioned at the pixel of interest is a value obtained such that the G pixel values of the twelve G pixels at respective pixel positions in the reference region illustrated in FIG. 18(2*a*) are multiplied by the coefficients (1/32 to 6/32) illustrated in FIG. 18(2*b*), and the multiplied values are added.

Meanwhile, when the pixel of interest as the central pixel is determined to be the false color pixel, the G low-band signal mG corresponding to the position of the pixel of interest is a value obtained such that the pixel values of the twelve G pixels at respective pixel positions in the reference regions illustrated in FIG. 18(2*a*) are multiplied by the coefficients (0/16 to 3/16) illustrated in FIG. 18(2*c*), and the multiplied values are added.

A substantially different point of the setting of the LPF coefficients between FIGS. 18(2*b*) and 18(2*c*) is coefficients with respect to the two G pixels close to the center. A large coefficient is set when the pixel of interest as the central pixel is determine not to be the false color pixel, and a small coefficient is set when the pixel of interest as the central pixel is determined to be the false color pixel.

With this processing, when the pixel of interest as the central pixel is determined not to be the false color pixel, the G low-band signal mG becomes a value to which the G pixel value close to the center of the reference region is reflected largely.

Meanwhile, when the pixel of interest as the central pixel is determined to be the false color pixel, the G low-band signal mG becomes a value in which reflection of the G pixel value close to the center of the reference region is zero or suppressed.

Note that the setting examples of the coefficients illustrated in FIGS. 18(2*a*) to 18(2*c*) are specific examples, and the coefficients may be set to other coefficients, as long as the LPF coefficients are set such that the pixel closer to the center of the reference region has a larger coefficient when the pixel of interest as the central pixel is determined not to be the false color pixel, and a pixel closer to the center of the reference region has a smaller coefficient when the pixel of interest is determined to be the false color pixel.

The examples illustrated in FIGS. 17(1a) to 17(1c) and FIGS. 18(2a) to 18(2c) are setting examples of the LPF coefficients applied to calculation of the G low-band signal mG of when the center of the input unit pixel region is the W pixel.

In processing of calculating various low-band signals mR, mG, mB, and mW in other cases of input unit pixel setting, the low-band signal calculation unit 202 also executes similar processing, and performs processing of calculating the low-band signal.

That is, the low-band signal calculation unit 202 executes the low-pass filter application processing and executes the processing of calculating the low-band signals mR, mG, mB, and mW in which the LPF coefficients are set such that a pixel closer to the center of the reference region has a larger coefficient when the pixel of interest as the central pixel in the reference region is determined not to be the false color pixel, and a pixel closer to the center of the reference region has a smaller coefficient when the pixel of interest is determined to be the false color pixel.

Figure 19:
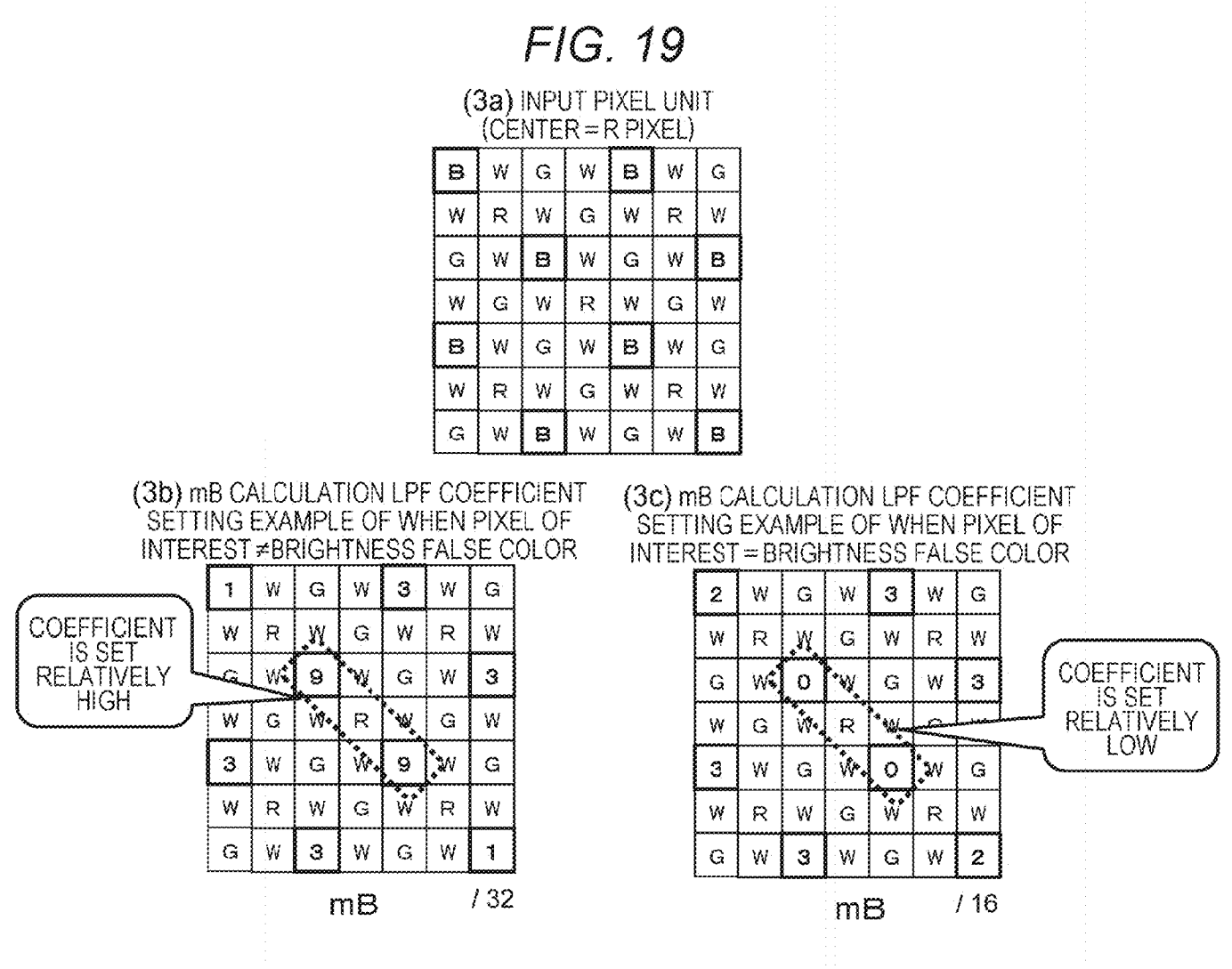

FIGS. 19(3a) to 19(3c) illustrate setting examples of LPFs applied to the processing of calculating the low-band signal mB of a B signal of when the central pixel of the input pixel unit is the R pixel.

FIG. 19(3a) illustrates an example of the input pixel unit, and illustrates the B pixels applied to the processing of calculating the low-band signal mB of the B signal of when the central pixel is the R pixel, by thick frame.

FIG. 19(3b) illustrates a setting example of a first low-pass filter (LPF) coefficient of when the pixel of interest as the central pixel is determined not to be the false color pixel, that is, a normal LPF coefficient set such that a pixel closer to the position of the pixel of interest, that is, a pixel closer to the center of the reference region has a larger coefficient.

FIG. 19(3c) illustrates a setting example of a second low-pass filter (LPF) coefficient of when the pixel of interest as the central pixel of the input pixel unit is determined to be the false color pixel, that is, an LPF coefficient in which a pixel closer to the position of the pixel of interest, that is, a pixel closer to the center of the reference region is set to have a smaller coefficient.

When the pixel of interest as the central pixel is determined not to be the false color pixel, a B low-band signal mB corresponding to the position of the pixel of interest is a value obtained such that the B pixel values of the eight B pixels at respective pixel positions in the reference region illustrated in FIG. 19(3a) are multiplied by the coefficients (1/32 to 9/32) illustrated in FIG. 19(3b), and the multiplied values are added.

Meanwhile, when the pixel of interest as the central pixel is determined to be the false color pixel, the B low-band signal mB corresponding to the position of the pixel of interest is a value obtained such that the pixel values of the eight B pixels at respective pixel positions in the reference regions illustrated in FIG. 19(3a) are multiplied by the coefficients (0/16 to 3/16) illustrated in FIG. 19(3c), and the multiplied values are added.

A substantially different point of the setting of the LPF coefficients between FIGS. 19(3b) and 19(3c) is coefficients with respect to the two B pixels close to the center. A large coefficient is set when the pixel of interest as the central pixel is determine not to be the false color pixel, and a small coefficient is set when the pixel of interest as the central pixel is determined to be the false color pixel.

With this processing, when the pixel of interest as the central pixel is determined not to be the false color pixel, the B low-band signal mB becomes a value to which the B pixel value close to the center of the reference region is reflected largely.

Meanwhile, when the pixel of interest as the central pixel is determined to be the false color pixel, the B low-band signal mB becomes a value in which reflection of the B pixel value close to the center of the reference region is zero or suppressed.

Note that the setting examples of the coefficients illustrated in FIGS. 19(3a) to 19(3c) are specific examples, and the coefficients may be set to other coefficients, as long as the LPF coefficients are set such that the pixel closer to the center of the reference region has a larger coefficient when the pixel of interest as the central pixel is determined not to be the false color pixel, and a pixel closer to the center of the reference region has a smaller coefficient when the pixel of interest is determined to be the false color pixel.

Figure 20:
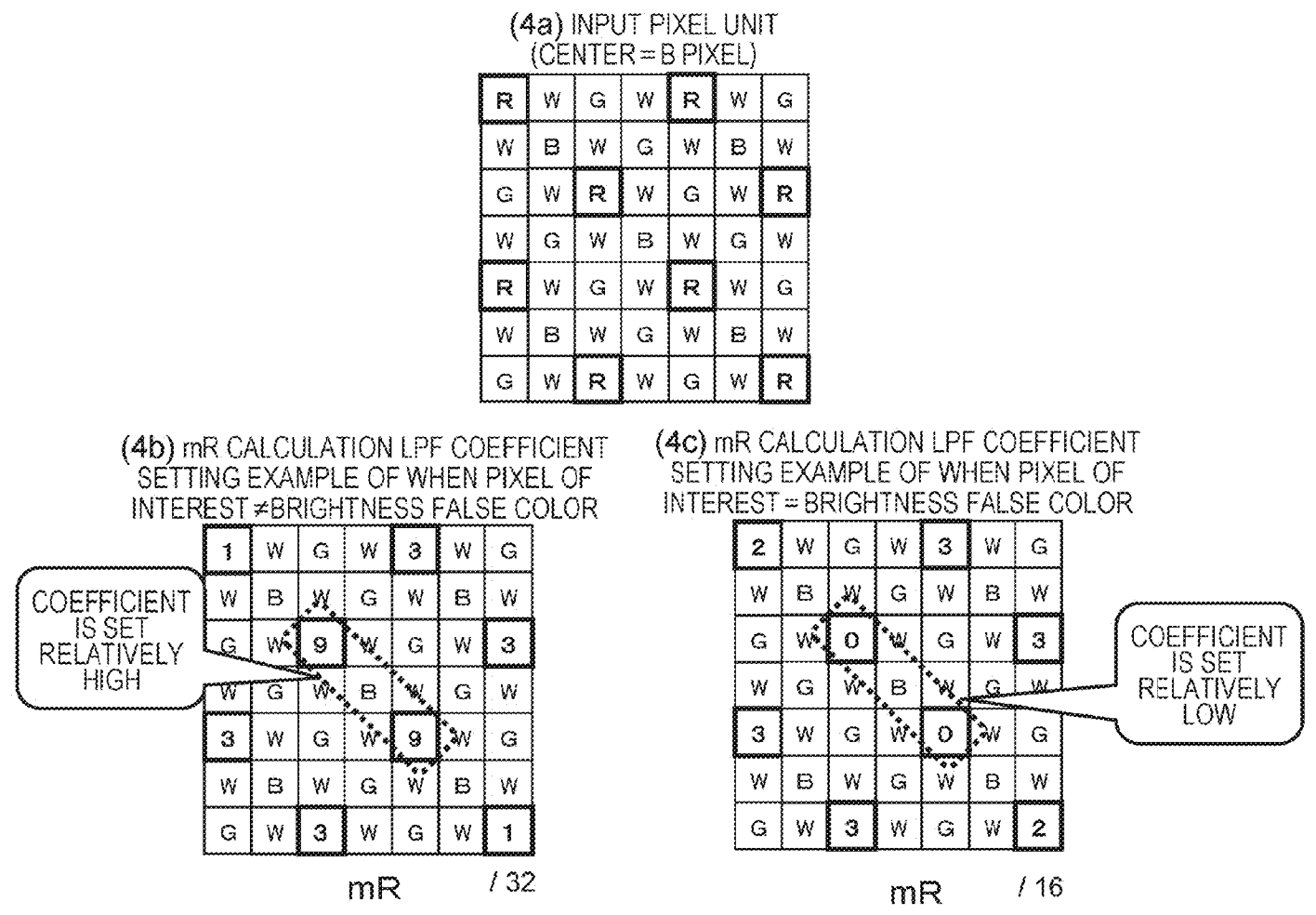

FIGS. 20(4a) to 20(4c) illustrate setting examples of LPFs applied to the processing of calculating the low-band signal mR of an R signal of when the central pixel of the input pixel unit is the B pixel.

FIG. 20(4b) illustrates an example of the input pixel unit and illustrates the R pixels applied to the processing of calculating the low-band signal mR of the R signal of when the central pixel is the B pixel, by thick frame.

FIG. 20(4b) illustrates a setting example of a first low-pass filter (LPF) coefficient of when the pixel of interest as the central pixel is determined not to be the false color pixel, that is, a normal LPF coefficient set such that a pixel closer to the position of the pixel of interest, that is, a pixel closer to the center of the reference region has a larger coefficient.

FIG. 20(4c) illustrates a setting example of a second low-pass filter (LPF) coefficient of when the pixel of interest as the central pixel of the input pixel unit is determined to be the false color pixel, that is, an LPF coefficient in which a pixel closer to the position of the pixel of interest, that is, a pixel close to the center of the reference region is set to have a smaller coefficient.

When the pixel of interest as the central pixel is determined not to be the false color pixel, a R low-band signal mR corresponding to the position of the pixel of interest is a value obtained such that the R pixel values of the eight R pixels at respective pixel positions in the reference region illustrated in FIG. 20(4a) are multiplied by the coefficients (1/32 to 9/32) illustrated in FIG. 20(4b), and the multiplied values are added.

Meanwhile, when the pixel of interest as the central pixel is determined to be the false color pixel, the R low-band signal mR corresponding to the position of the pixel of interest is a value obtained such that the pixel values of the eight R pixels at respective pixel positions in the reference regions illustrated in FIG. 20(4a) are multiplied by the coefficients (0/16 to 3/16) illustrated in FIG. 20(4c), and the multiplied values are added.

A substantially different point of the setting of the LPF coefficients between FIGS. 20(4b) and 20(4c) is coefficients with respect to the two B pixels close to the center. A large coefficient is set when the pixel of interest as the central pixel is determined not to be the false color pixel, and a small coefficient is set when the pixel of interest as the central pixel is determined to be the false color pixel.

With this processing, when the pixel of interest as the central pixel is determined not to be the false color pixel, the R low-band signal mR becomes a value to which the R pixel value close to the center of the reference region is reflected largely.

Meanwhile, when the pixel of interest as the central pixel is determined to be the false color pixel, the R low-band signal mR becomes a value in which reflection of the R pixel value close to the center of the reference region is zero or suppressed.

Note that the setting examples of the coefficients illustrated in FIGS. 20(4a) to 20(4c) are specific examples, and the coefficients may be set to other coefficients, as long as the LPF coefficients are set such that the pixel closer to the center of the reference region has a larger coefficient when the pixel of interest as the central pixel is determined not to be the false color pixel, and a pixel closer to the center of the reference region has a smaller coefficient when the pixel of interest is determined to be the false color pixel.

In this way, the low-band signal calculation unit 202 inputs the determination information indicating whether the pixel of interest in the center of the input pixel unit as a pixel of the object to be processed is the brightness false color, from the false color detection unit, calculates the low-band signals mR, mG, mB, and mW of respective RGBW signals by the LPF application processing in which the different LPF coefficients are set according to the input information, and inputs the calculated signals to the pixel interpolation unit 203.

The pixel interpolation unit 203 performs pixel interpolation processing of converting an RGBW array into an RGB array, that is, re-mosaic processing, applying the low-band signals mR, mG, mB, and mW of the respective RGBW signals input from the low-band signal calculation unit 202.

Note that, as described above, the pixel interpolation processing executed by the pixel interpolation unit 203 is processing according to the processing described in Japanese Patent Application Laid-Open No. 2011-182354, which is an earlier application of the applicant of the present application, except for using the low-band signals mR, mG, mB, and mW input from the low-band signal calculation unit 202.

That is, the pixel interpolation unit 203 executes the following processing as the processing of converting an RGBW pixel array to an RGB pixel array:

processing of converting the W pixel into the G pixel;
processing of converting the G pixel into the R or B pixel;
processing of converting the R pixel into the B pixel; and
processing of converting the B pixel into the R pixel.

When performing these pieces of conversion processing, the pixel interpolation unit 203 sets, according to a pixel color of a destination of the conversion between the pixels of interest, the W pixels in the reference region to be the pixel color, and calculates the pixel value of the pixel of interest, on an assumption that the following relations are established:

a proportional relation between the low-band signal mW of the W pixel and the low-band signal mG of the G pixel;
a proportional relation between the low-band signal mW of the W pixel and the low-band signal mR of the R pixel; and
a proportional relation between the low-band signal mW of the W pixel and the low-band signal mB of the B pixel;
are established in a local region such as the 7×7 reference region, for example.

In this processing, the low-band signals mR, mG, mB, and mW of the respective RGBW signals input from the low-band signal calculation unit 202 is applied.

The low-band signals mR, mG, mB, and mW of the respective RGBW signals input from the low-band signal calculation unit 202 become signals in which the degree of reflection of the pixel values in the vicinity of the brightness false color region is suppressed to be low when the pixel of interest that is to be the object to be converted is determined to have the brightness false color, and as a result, the pixel interpolation unit 203 can set an interpolation pixel value in which the influence of the false color is suppressed.

A processing sequence executed by the data conversion processing unit of the image processing device of the present disclosure will be described with reference to the flowchart illustrated in FIG. 21.

Figure 21:
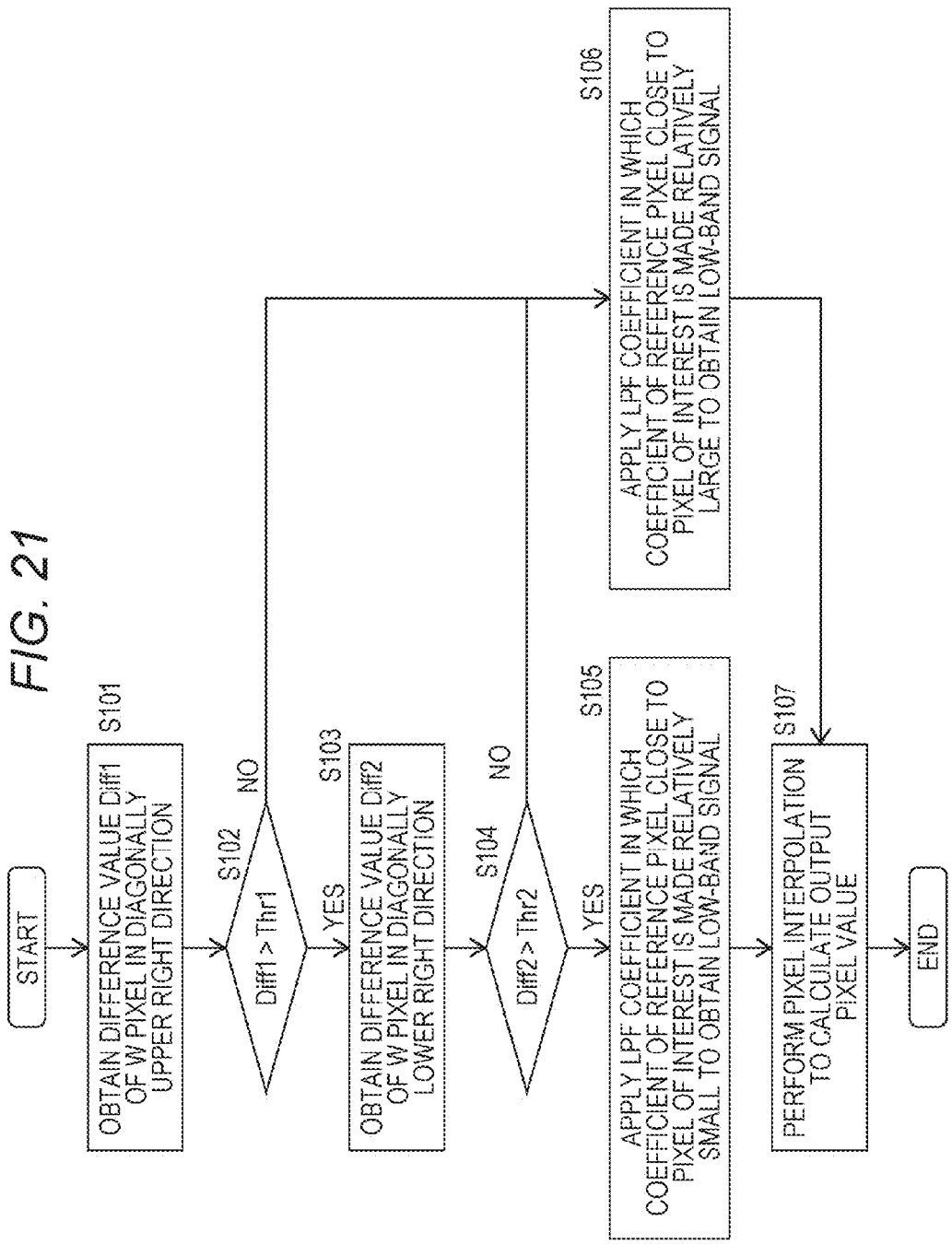
FIG. 21 is a diagram illustrating a flowchart illustrating a sequence of processing executed by the image processing device of the present disclosure.

The flowchart illustrated in FIG. 21 is a processing sequence with respect to one pixel to be converted of when the RGBW array is converted into the RGB array, and is processing executed in the data conversion processing unit by inputting the reference pixel region including the pixel to be converted, for example, the 7×7 pixel region. The processing according to the flow illustrated in FIG. 21 is sequentially executed with respect to pies processed pixels.

First, in step S101, the difference value Diff1 of W in the diagonally upper right direction of the reference region is obtained.

Next, in step S102, the Diff1 and the threshold Thr1 are compared.

This processing is the processing executed by the false color detection unit 201 illustrated in FIG. 5, and is the processing described with reference to FIGS. 8(1a) to 8(1c), FIGS. 10(3a) to 10(3c), and FIGS. 12(a) to 12(e).

A plurality of diagonally lower right lines is set from a position close to the center of the reference region, the W low-band signals are calculated using a plurality of W pixel values on the respective lines, and a difference value between the maximum W low-frequency signal value in a plurality of lines closer to the center, and the maximum W low-frequency signal value in a plurality of lines distant from the center is calculated. That is, the difference value of the W pixels in the diagonally upper right direction perpendicular to the four diagonally lower right lines is calculated as the Diff1.

Further, the calculated difference value Diff1 and the predetermined threshold Thr1 are compared.

As a result of the comparison processing between the Diff1 and the threshold Thr1 in step S102, when the Diff1 is larger than the threshold Thr1 (Yes), the processing proceeds to step S103, and when the Diff1 is not larger than the threshold Thr1 (No), the processing proceeds to step S106.

The case where the Diff1 is not larger than the threshold Thr1 (No) is a case in which the pixel of interest is determined not to be the brightness false color, and the processing proceeds to step S106, and a necessary low-band signal is calculated by the low-pass filter (LPF) application processing in which the LPF coefficient of the reference signal close to the pixel of interest is set relatively high. Note that the necessary low-band signal is a low-band signal necessary for being applied to the processing of converting the pixel of interest to be executed in the pixel interpolation unit 203. At least one or more low-band signals of the low-band signals mR, mG, mB, and mW are calculated.

The processing of calculating the low-band signals is the processing of the low-band signal calculation unit 202 illustrated in FIG. 5.

For example, as illustrated in FIGS. 17(1b) and 18(2b), the low-band signals are calculated by the low-pass filter (LPF) application processing in which the LPF coefficient of the reference pixel close to the pixel of interest is set relatively high.

Meanwhile, as a result of the comparison processing between the Diff1 and the threshold Thr1 of step S102, when the Diff1 is determined to be larger than the threshold Thr1 (Yes), the processing proceeds to step S103.

This case is a case where the pixel of interest is determined to be the brightness false color occurring pixel. In this case, the processing proceeds to step S103.

In step S103, the difference value Diff2 of W in the diagonally lower right direction of the reference region is obtained.

Next, in step S104, the Diff2 and the threshold Thr2 are compared.

This processing is the processing described with reference to FIGS. 9(2a) to 9(2c), FIGS. 11(4a) to 11(4c), and FIGS. 13(5a) to 13(5c).

A plurality of diagonally upper right lines is set from a position close to the center of the reference region, the W low-band signals are calculated using a plurality of W pixel values on the respective lines, and a difference value between the maximum W low-frequency signal value of a plurality of lines closer to the center, and the maximum W low-frequency signal value of a plurality of lines distant from the center is calculated. That is, for example, the difference value of the W pixels in the diagonally lower right direction perpendicular to the five diagonally upper right lines is calculated as the Diff2.

Further, the calculated difference value Diff2 and the predetermined threshold Thr2 are compared.

As a result of the comparison processing between the Diff2 and the threshold Thr2 of step S104, when the Diff2 is larger than the threshold Thr2 (Yes), the processing proceeds to step S105, and when the Diff2 is not larger than the threshold Thr2 (No), the processing proceeds to step S106.

The case where the Diff2 is not larger than the threshold Thr2 (No) is a case where the pixel of interest is determined not to be the brightness false color, and the processing proceeds to step S106. A necessary low-band signal is calculated by the low-pass filter (LPF) application processing in which the LPF coefficient of the reference pixel close to the pixel of interest is set relatively high. Note that the necessary low-band signal is a low-band signal necessary for being applied to the processing of converting the pixel of interest to be executed in the pixel interpolation unit 203. At least one or more low-band signals of the low-band signals mR, mG, mB, and mW are calculated.

This processing of calculating the low-band signal is the processing of the low-band signal calculation unit 202 of FIG. 5.

For example, as illustrated in FIGS. 17(1b) and 18(2b), the low-band signals are calculated by the low-pass filter (LPF) application processing in which the LPF coefficient of the reference pixel close to the pixel of interest is set relatively high.

Meanwhile, as a result of the comparison processing between the Diff2 and the threshold Thr2 of step S104, when the Diff2 is determined to be larger than the threshold Thr2 (Yes), the processing proceeds to step S105.

This case is a case where the pixel of interest is determined to be the brightness false color occurring pixel. In this case, the processing proceeds to step S105.

In step S105, a necessary low-band signal is calculated by the low-pass filter (LPF) application processing in which the LPF coefficient of the reference pixel close to the pixel of interest is set relatively low. Note that the necessary low-band signal is a low-band signal necessary for being applied to the processing of converting the pixel of interest to be executed in the pixel interpolation unit 203. At least one or more low-band signals of the low-band signals mR, mG, mB, and mW are calculated.

This processing of calculating the low-band signals is the processing of the low-band signal calculation unit 202 illustrated in FIG. 5.

For example, as illustrated in FIGS. 17(1c) and 18(2c), the low-band signals are calculated by the low-pass filter (LPF) application processing in which the LPF coefficient of the reference pixel close to the pixel of interest is set relatively low.

In step S107, an interpolation pixel value of the pixel of interest is calculated, applying either the low-band signals generated in step S105, or the low-band signals generated in step S106.

This processing is the processing executed by the pixel interpolation unit 203 illustrated in FIG. 5.

The pixel interpolation unit 203 performs the interpolation processing using the low-band signals generated in step S105 when the pixel of interest is determined to be the brightness false color, and using the low-band signals generated in step S106 when the pixel of interest is determined not to be the brightness false color.

To be specific, when the pixel of interest is determined to be the brightness false color, the pixel interpolation unit 203 performs the interpolation processing using the low-band signals generated by the low-pass filter (LPF) application processing in which the LPF coefficient of the reference pixel close to the pixel of interest is set relatively low.

Meanwhile, when the pixel of interest is determined not to be the brightness false color, the pixel interpolation unit 203 performs the interpolation processing using the low-band signals generated by the low-pass filter (LPF) application processing in which the LPF coefficient of the reference pixel close to the pixel of interest is set relatively high.

With these pieces of processing, with respect to the interpolation pixel value of the pixel region determined to be the brightness false color, the setting of the interpolation pixel value in which the effect of the brightness false color is reduced is performed.

Note that the processing illustrated in FIG. 21 is executed according to the program stored in the memory 130 illustrated in FIG. 4 under control of the control unit 140, for example.

The data conversion processing unit 200 illustrated in FIGS. 4 and 5 generates an image by the above-described processing, according to the RGB array 182 as a result of the false color correction and the re-mosaic processing, and outputs the image to the RGB signal processing unit 250.

The RGB signal processing unit 250 executes processing similar to the signal processing unit included in the conventional camera, or the like. To be specific, the RGB signal processing unit 250 executes the de-mosaic processing, the white balance adjustment processing, the 7 correction processing, and the like, to generate the color image 183. The generated color image 183 is recorded in the memory 130.

[2. A Modification of a False Color Detection Unit and a Low-Band Signal Calculation Unit]

In the above-described embodiment, the false color detection unit 201 determines that the pixel of interest is the brightness false color occurring pixel when the two determination expressions of the determination processing are satisfied:

the determination processing of step S102 in the flow of FIG. 21, that is,
Diff1>Thr1, and
the determination processing of step S104, that is,
Diff2>Thr2.

Further, the description has been given in that the low-band signal calculation unit executes the processing of calculating the low-band signals, applying the different LPF coefficients according to whether the pixel of interest is the brightness false color pixel, as described with reference to FIGS. 17(1a) to 17(1c) and FIGS. 18(2a) to 18(2c).

The processing of detecting the false color by the false color detection unit 201 and the processing of calculating the low-band signals by the low-band signal calculation unit 202 are not limited thereto, and a configuration in which other pieces of processing are executed may be employed. An example will be described below.

FIGS. 22(a) to 22(g) illustrates examples of highlighted regions where a brightness false color occurs, when G pixels are positioned to the left of and below a central W pixel. Regions within the dotted line frames in FIGS. 22(a) to 22(g) are the highlighted regions.

A false color detection unit 201 focuses on W pixels in an input pixel unit, that is, in a reference region of 7×7 pixels, and detects W pixels having a high pixel value. Further, the false color detection unit 201 determines whether the W pixels having a high pixel value match a pattern of W pixels in any of the highlighted regions illustrated in FIGS. 22(a) to 22(g). Note that, as a way of obtaining arrangement of appropriate W pixels, a typically used method such as pattern matching can be applied.

When the W pixels having a high pixel value match a pattern of W pixels in any of the highlighted regions illustrated in FIGS. 22(a) to 22(g), the false color detection unit 201 determines that the pixel region is a brightness false color occurring region.

Next, the low-band signal calculation unit 202 select an LPF corresponding to the arrangement of W pixels obtained in the false color detection unit 201, and calculates a low-band signal to be applied to pixel interpolation processing.

FIGS. 23(a) to 23(g) illustrates examples of setting LPF coefficients to be applied to calculation of low-band signals mG of G signal.

FIGS. 23(a) to 23(g) are examples of setting LPF coefficients to be applied to calculation of low-band signals mG used corresponding to the highlighted regions of FIGS. 22(a) to 22(g).

Pixels in which L or H is described illustrated in FIGS. 23(a) to 23(g) are the G pixels where
L indicates a pixel in which a relatively low LPF coefficient is set, and
H indicates a pixel in which a relatively high LPF coefficient is set.

As illustrated in FIGS. 23(a) to 23(g), the LPF coefficients in the positions of the G pixels in the highlighted regions are set relatively small.

For example, when the highlighted region of four pixels illustrated in FIG. 22(a) is detected, a desired low-band signal is obtained by convolution operation of the input pixel unit with the setting of the LPF coefficients illustrated in FIG. 23(a).

Regarding the LPF coefficients illustrated in FIG. 23(a), only the coefficients in the G pixel positions in the highlighted region illustrated in FIG. 22(a) are L, and coefficients in other G pixel positions are H.

The low-band signal mG is calculated using a low-pass filter to which such coefficients are applied, whereby the low-band signal mG in which an effect of G pixel values in the highlighted region is decreased can be calculated.

The same applies to cases of other highlighted regions illustrated in FIGS. 22(b) to 22(g), and the low-band signals in which a contribution rate of pixel values in the highlighted regions is low are calculated as illustrated in FIGS. 23(b) to 23(g).

When a position of a pixel of interest is included in the highlighted region in this way, the low-band signal calculation unit 202 calculates a low-band signal in which the contribution rate of the pixel values that configure the highlighted region is low according to the shape of the highlighted region, and outputs the low-band signal to the pixel interpolation unit 203.

FIGS. 24(a) to 24(h) illustrates examples in which the highlighted regions are configured from W, R, and B pixels. Regions within the dotted line frames in FIGS. 24(a) to 24(h) are the highlighted regions.

The false color detection unit 201 focuses on the W pixels in the input pixel unit, that is, in the reference regions of 7×7 pixels, and detects the W pixels having a high pixel value. Further, the false color detection unit 201 determines whether the W pixels having a high pixel value match pattern of the W pixels in any of the highlighted regions illustrated in FIGS. 24(a) to 24(h). Note that, as a way of obtaining arrangement of appropriate W pixels, a typically used method such as pattern matching can be applied.

When the W pixels having a high pixel value match a pattern of the W pixels in any of the highlighted regions illustrated in FIGS. 24(a) to 24(h), the false color detection unit 201 determines that the pixel region is a brightness false color occurring region.

Next, the low-band signal calculation unit 202 select an LPF corresponding to the arrangement of the W pixels obtained in the false color detection unit 201, and calculates a low-band signal to be applied to the pixel interpolation processing.

FIGS. 25(a) to 25(h) illustrates examples of setting LPF coefficients to be applied to calculation of low-band signals mB of B signal.

FIGS. 25(a) to 25(h) are examples of setting LPF coefficients to be applied to calculation of low-band signals mB used corresponding to the highlighted regions of FIGS. 24(a) to 24(h).

Pixels in which L or H is described illustrated in FIGS. 25(a) to 25(h) are the B pixels where
L indicates a pixel in which a relatively low LPF coefficient is set, and
H indicates a pixel in which a relatively high LPF coefficient is set.

As illustrated in FIGS. 25(a) to 25(h), the LPF coefficients in the positions of the B pixels in the highlighted regions are set relatively small.

Figure 24:
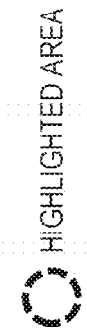
FIGS. 24(a) to 24(h) are diagrams illustrating processing executed by the false color detection unit of the image processing device of the present disclosure.
Figure 25:
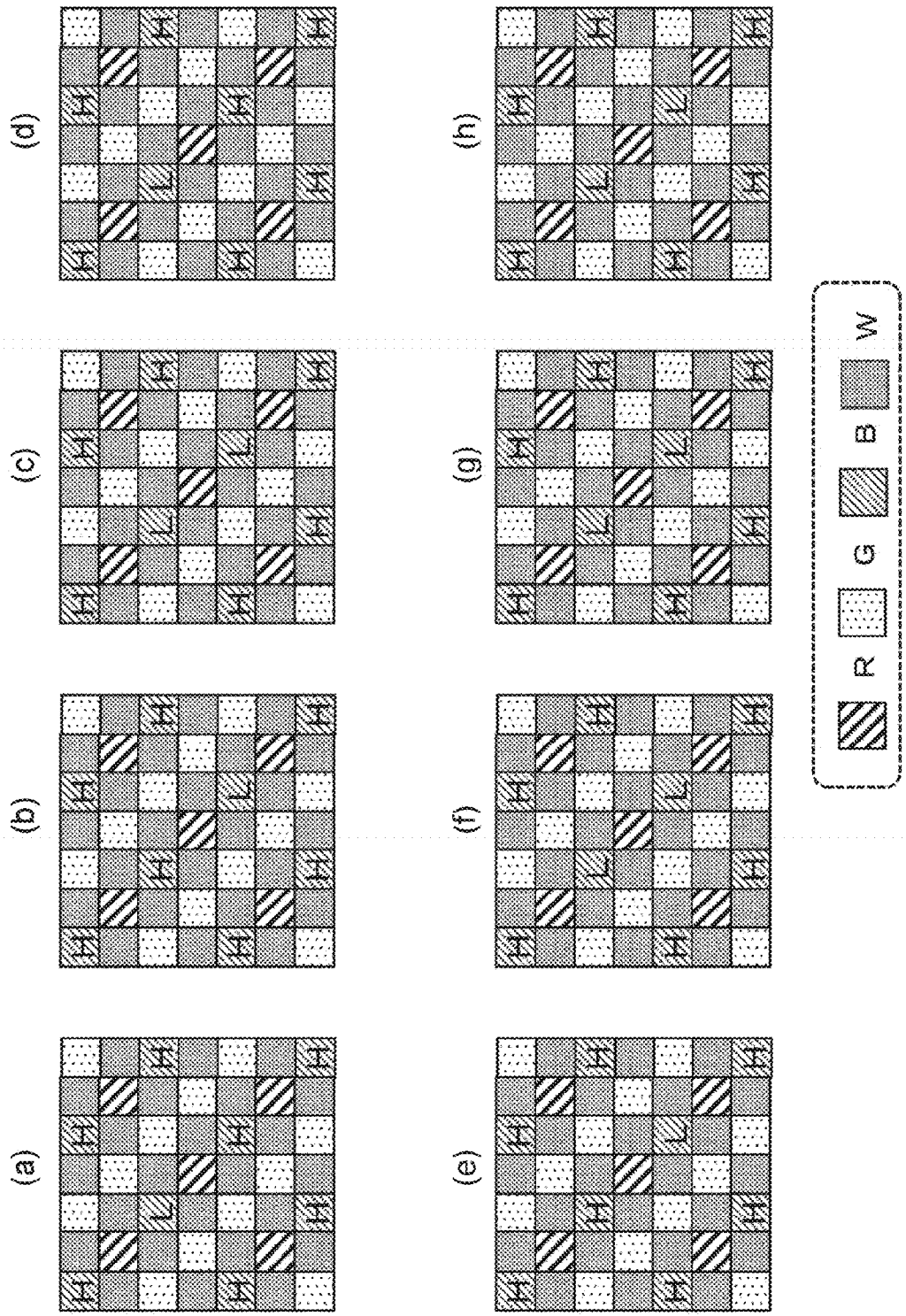
FIGS. 25(a) to 25(h) are diagrams illustrating processing executed by the low-band signal calculation unit of the image processing device of the present disclosure.

For example, when the highlighted region of four pixels illustrated in FIG. 24(a) is detected, a desired low-band signal is obtained by convolution operation of the input pixel unit with the setting of the LPF coefficients illustrated in FIG. 25(a).

Regarding the LPF coefficients illustrated in FIG. 25(a), only the coefficients in the B pixel positions in the highlighted region illustrated in FIG. 24(a) are L, and coefficients in other B pixel positions are H.

The low-band signal mB is calculated using a low-pass filter to which such coefficients are applied, whereby the low-band signal mB in which an effect of B pixel values in the highlighted region is decreased can be calculated.

The same applies to cases of other highlighted regions illustrated in FIGS. 24(b) to 24(h), and the low-band signals in which a contribution rate of pixel values in the highlighted regions is low are calculated as illustrated in FIGS. 25(b) to 25(h).

When a position of a pixel of interest is included in the highlighted region in this way, the low-band signal calculation unit 202 calculates a low-band signal in which the contribution rate of the pixel values that configure the highlighted region is low according to the shape of the highlighted region, and outputs the low-band signal to the pixel interpolation unit 203.

The pixel interpolation unit 203 executes the interpolation processing using the low-band signal in which the contribution rate of the pixel values that configure the highlighted region calculated by the low-band signal calculation unit 202 is low.

With the processing, an optimum low-bans signal according to the shape of the highlighted region can be calculated, and optimum pixel interpolation where the contribution rate of the pixel values in the highlighted region is low can be realized.

Figure 26:
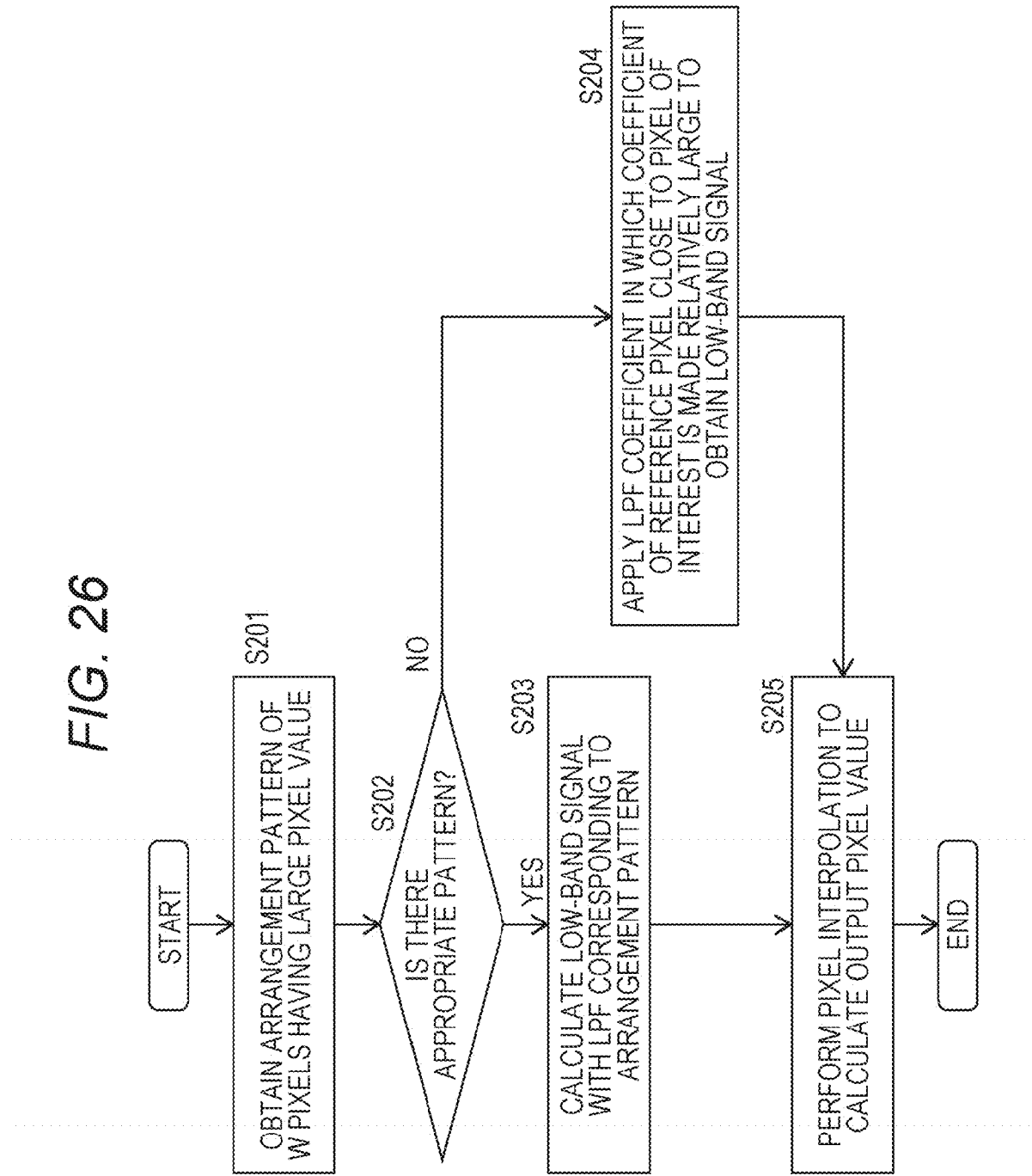
FIG. 26 is a diagram illustrating a flowchart illustrating a sequence of processing executed by the image processing device of the present disclosure.

FIG. 26 is a diagram illustrating a flowchart of when detection of a brightness false color, calculation of a low-band signal, and pixel interpolation are performed according to the present embodiment.

The flowchart illustrated in FIG. 26 is, similarly to the flow of FIG. 21 described above, a processing sequence with respect to one pixel to be converted of when an RGBW array is converted into an RGB array, and is processing of inputting a reference pixel region including a pixel to be converted, for example, a 7×7 pixel region, and executing in the data conversion processing unit. The processing according to the flow illustrated in FIG. 26 is sequentially executed with respect to processed pixels.

Hereinafter, each step will be described.

In step S201, first, an arrangement pattern of W pixels having a large pixel value is detected from the reference region.

Next, in step S202, it is determined whether the arrangement pattern of W pixels having a large pixel value detected in step S201 match a pattern of a highlighted region registered in a memory in advance. In the memory, patterns of the highlighted regions illustrated in FIGS. 22(*a*) to 22(*g*) are registered in advance.

This processing is the processing executed by the false color detection unit 201 illustrated in FIG. 5.

In step S202, when the false color detection unit 201 determines that there is no registration pattern that matches the arrangement pattern of W pixels having a high pixel value (No), the processing proceeds to step S204.

This case is a case where the pixel of interest is determined not to be the brightness false color. The processing proceeds to step S204, and a necessary low-band signal is calculated by low-pass filter (LPF) application processing in which the LPF coefficient of the reference pixel close to the pixel of interest is set relatively high. Note that the necessary low-band signal is a low-band signal necessary for being applied to conversion processing of the pixel of interest to be executed in the pixel interpolation unit 203. At least one or more low-band signals of low-band signals mR, mG, mB, and mW are calculated.

This processing of calculating the low-band signal is the processing of the low-band signal calculation unit 202 of FIG. 5.

For example, as illustrated in FIGS. 17(1*b*) and 18(2*b*), the low-band signals are calculated by the low-pass filter (LPF) application processing in which the LPF coefficient of the reference pixel close to the pixel of interest is set relatively high.

Meanwhile, in step S202, when a registered pattern that matches the detected arrangement pattern of W pixels having a high pixel value is detected (Yes), the processing proceeds to step S203.

In step S203, an LPF coefficient corresponding to the registration pattern that matches the detected arrangement pattern of W pixels having a high pixel value is selected, and a low-band signal that enables execution of processing that also serves as false color correction is calculated.

This processing of calculating a low-band signal is the processing of the low-band signal calculation unit 202 illustrated in FIG. 5.

The low-band signal calculation unit 202 inputs information of the registration pattern matching the arrangement pattern of W pixels having a high pixel value from the false color detection unit 201, and calculates a low-band signal according to the information by low-pass filter (LPF) application processing to which the LPF coefficient corresponding to the registration pattern is set.

Figure 22:
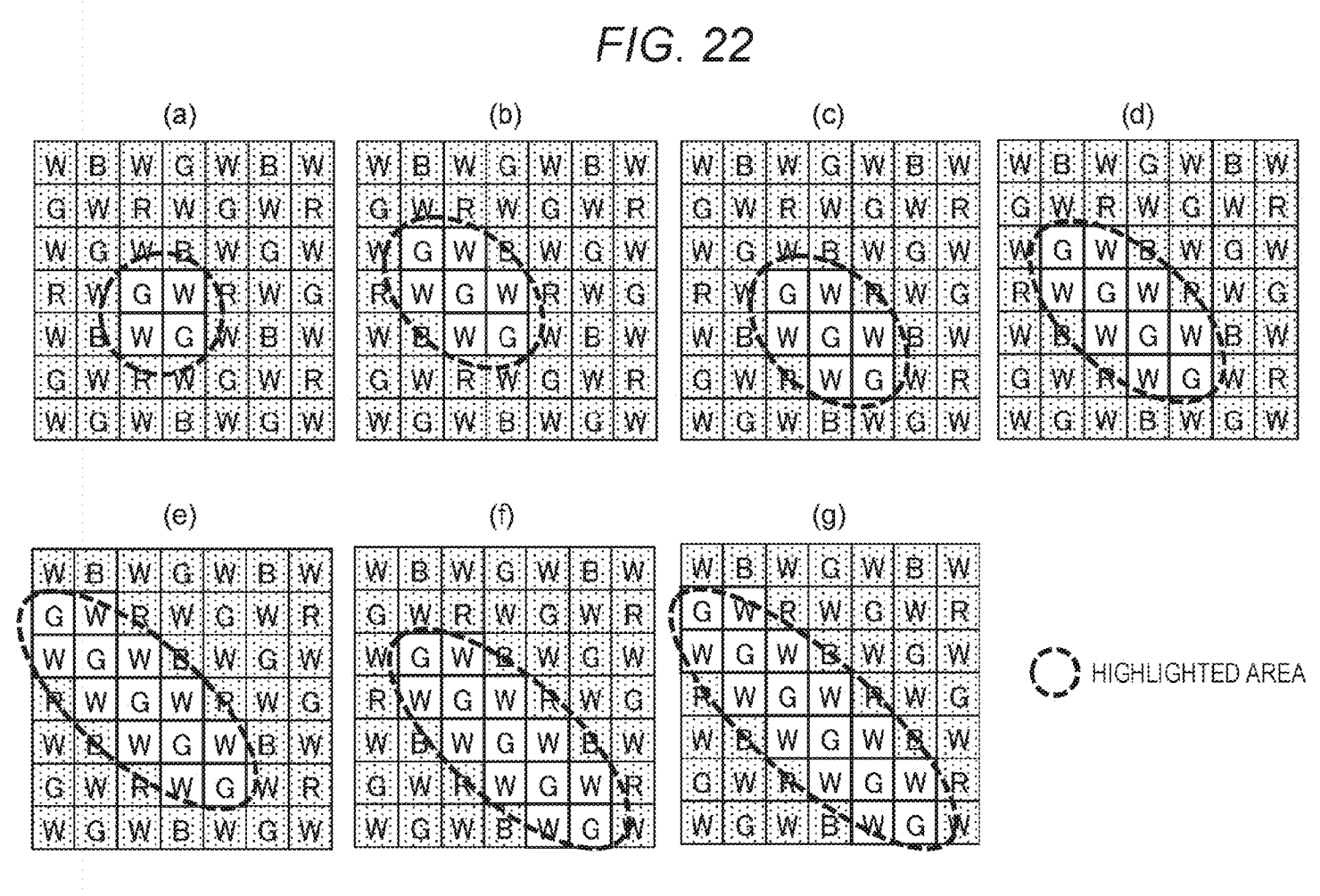
Figure 23:
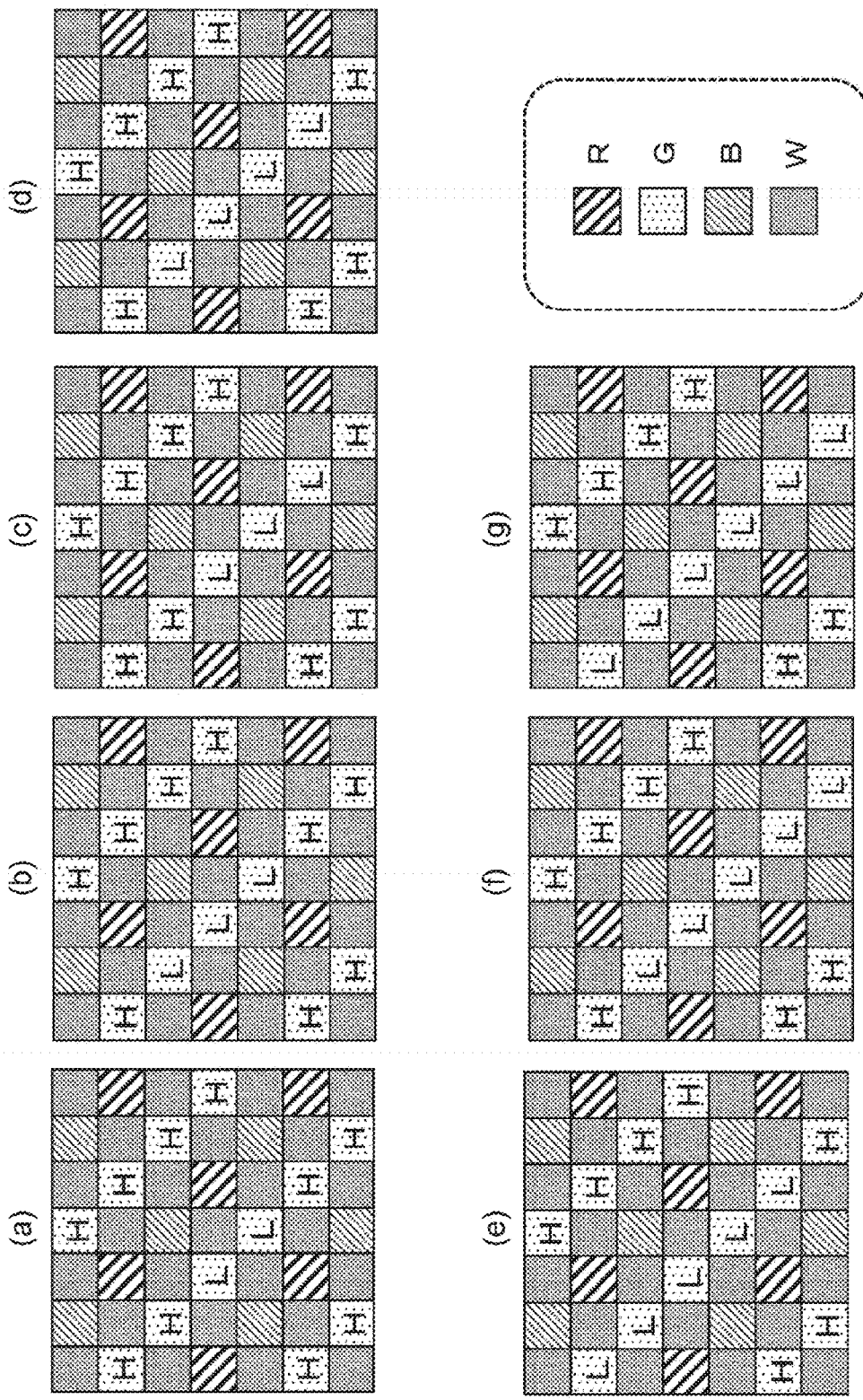
FIGS. 23(a) to 23(g) are diagrams illustrating processing executed by the low-band signal calculation unit of the image processing device of the present disclosure.

That is, when the registration pattern that matches the arrangement pattern of W pixels having a high pixel value is FIG. 22(*a*), the low-band signal is calculated by the low-pass filter (LPF) application processing in which the LPF coefficient of the reference pixel close to the pixel of interest illustrated in FIG. 23(*a*) is set relatively low.

The same applies to cases where the registration pattern matching the arrangement pattern of W pixels having a high pixel value is another registration pattern of FIGS. 22(*b*) to 22(*g*). In each of the cases, the low-band signal is calculated by the low-pass filter (LPF) application processing in which the LPF coefficient of the reference pixel close to the pixel of interest illustrated in FIGS. 23(*b*) to 23(*g*) is set relatively low.

In step S205, the interpolation pixel value of the pixel of interest is calculated applying either the low-band signal generated in step S203 or the low-band signal generated in step S204.

This processing is the processing of the pixel interpolation unit 203 illustrated in FIG. 5.

The pixel interpolation unit 203 performs the interpolation processing using the low-band signals generated in step S203 when the pixel of interest is determined to be the brightness false color, and using the low-band signals generated in step S204 when the pixel of interest is determined not to be the brightness false color.

To be specific, when the pixel of interest is determined to be the brightness false color, the pixel interpolation unit 203 performs the interpolation processing using the low-band signals generated by the low-pass filter (LPF) application processing in which the LPF coefficient of the reference pixel close to the pixel of interest is set relatively low, as illustrated in FIGS. 23(*a*) to 23(*g*).

Meanwhile, when the pixel of interest is determined not to be the brightness false color, the pixel interpolation unit 203 performs the interpolation processing using the low-band signals generated by the low-pass filter (LPF) application processing in which the LPF coefficient of the reference pixel close to the pixel of interest is set relatively high.

With these pieces of processing, with respect to the interpolation pixel value of the pixel region determined to be the brightness false color, the setting of the interpolation pixel value in which the effect of the brightness false color is reduced is performed.

Note that the processing illustrated in FIG. 26 is executed according to the program stored in the memory 130 illustrated in FIG. 4 under control of the control unit 140, for example.

The data conversion processing unit 200 illustrated in FIGS. 4 and 5 generates an image by the above-described processing, according to the RGB array 182 as a result of the false color correction and the de-mosaic processing, and outputs the image to the RGB signal processing unit 250.

The RGB signal processing unit 250 executes processing similar to the signal processing unit included in the conventional camera, or the like. To be specific, the RGB signal processing unit 250 executes the de-mosaic processing, the white balance adjustment processing, the 7 correction processing, and the like, to generate the color image 183. The generated color image 183 is recorded in the memory 130.

[3. Effects by Processing of an Image Processing Device of the Present Disclosure]

By performing of the processing of the image processing device of the present disclosure described above, the following effects can be obtained, for example.

(a) The false color occurring in a small area on an imaging plane, such as sunshine filtering through leaves, can be decreased.

(b) The false color can be decreased even when blown-out highlights such as purple fringing are not caused.

(c) Correction with less deterioration of image quality can be performed, compared with a method of decreasing resolution using an optical low-pass filter.

(d) The processing can be applied to raw data before demosaic, the image processing device can be incorporated in an image sensor, and the like.

(e) The processing can be applied to an array image including white pixels in a color filter.

The above effect can be exhibited, for example.

[4. Conclusion of Configurations of the Present Disclosure]

Embodiments of the present disclosure have been described in detail with reference to specific examples. However, it is apparent that modifications and substitutions of the embodiments can be achieved by a person skilled in the art without departing from the gist of the present disclosure. That is, the present invention has been disclosed in the form of exemplary description, and should not be restrictively construed. To judge the gist of the present disclosure, the claims should be considered.

Note that the technology disclosed in the present specification can employ the following configurations:

(1) An image processing device including:
  a data conversion processing unit configured to have an RGBW array image as an input image, and to generate an RGB array image as an output image,
  the data conversion processing unit including
  a false color detection unit configured to detect a false color pixel in the input image, and to output detection information,
  a low-band signal calculation unit configured to be input the detection information from the false color detection unit, and to change a processing aspect according to the detection information to calculate low-band signals corresponding to respective RGBW colors, and a pixel interpolation unit configured to execute
  pixel conversion of the RGBW array of the input image by pixel interpolation to which the low-band signals calculated by the low-band signal calculation unit to generate the RGB array image, and
  the interpolation processing unit
  calculates an interpolation pixel value on an assumption that a low-band signal mW of a W pixel and low-band signals mR, mG, and mB of respective RGB pixels have a proportional relation in a local region.

(2) The image processing device according to (1) above, wherein when having been input the detection information that a pixel of interest is the false color pixel from the false color detection unit, the low-band signal calculation unit applies a low-pass filter to which a low-pass filter coefficient in which a pixel value contribution rate of a pixel near the pixel of interest is made relatively lower than that of a pixel separated from the pixel of interest is set to calculate the low-band signals.

(3) The image processing device according to (1) or (2) above, wherein when having been input the detection information that a pixel of interest is not the false color pixel from the false color detection unit, the low-band signal calculation unit applies a low-pass filter to which a low-pass filter coefficient in which a pixel value contribution rate of a pixel near the pixel of interest is made relatively higher than that of a pixel separated from the pixel of interest is set to calculate the low-band signals.

(4) The image processing device according to any of (1) to (3) above, wherein the false color detection unit detects presence/absence of existence of a locally highlighted region that is a locally high brightness region in the input image, and when a pixel of interest is included in the locally highlighted region, the false color detection unit determines that the pixel of interest is the false color pixel.

(5) The image processing device according to any of (1) to (4) above, wherein the false color detection unit detects incline information of W pixels near a pixel of interest, and when a W pixel value near the pixel of interest is higher than a peripheral W pixel value in both of two perpendicular directions, the false color detection unit determines that the pixel of interest is included in a locally highlighted region that is a locally high brightness region, and the pixel of interest is the false color pixel.

(6) The image processing device according to any of (1) to (5) above, wherein the false color detection unit (a) calculates W pixel low-frequency component signals corresponding to respective lines based on pixel values of a plurality of W pixels in a plurality of diagonally lower right lines set near a pixel of interest, and executes comparison processing between a difference value Diff1 between a maximum value of the W pixel low-frequency component signals of a plurality of inner-side lines close to the pixel of interest and a maximum value of the W pixel low-frequency component signals of a plurality of outer-side lines distant from the pixel of interest, and a threshold Thr1, and (b) calculates W pixel low-frequency component signals corresponding to respective lines based on pixel values of a plurality of W pixels in a plurality of diagonally upper right lines set near a pixel of interest, and executes comparison processing between a difference value Diff2 between a maximum value of the W pixel low-frequency component signals of a plurality of inner-side lines close to the pixel of interest and a maximum value of the W pixel low-frequency component signals of a plurality of outer-side lines distant from the pixel of interest, and a threshold Thr2, and as comparison results of the two cases of the above (a) and (b), when the difference value is larger than the threshold in both cases, the false color detection unit determines that the pixel of interest is the false color pixel.

(7) The image processing device according to any of (1) to (6) above, wherein the false color detection unit detects a false color occurring when a W pixel and a G pixel are concentrated in a locally highlighted region that is a locally high brightness region in the input image, or when a W pixel, an R pixel, and a B pixel are concentrated in the locally highlighted region.

(8) The image processing device according to any of (1) to (7) above, wherein the false color detection unit
  detects W pixels having a high pixel value from the input image, compares a configuration pattern of the detected W pixels having a high pixel value, and a registered highlighted region pattern that is a shape of a locally high brightness region recorded in a memory in advance, and determines that a pixel included in the configuration pattern of the W pixels having a high pixel value is the false color pixel when the configuration pattern of the detected W pixels having a high pixel value match the registered highlighted region pattern.

(9) The image processing device according to (8) above, wherein the low-band signal calculation unit applies a low-pass filter to which a low-pass filter coefficient in which a pixel value contribution rate of a highlighted region is made relatively lower than that of a pixel outside the highlighted region, according to the registered highlighted region pattern determined to match the configuration pattern of the W pixels having a high pixel value by the false color detection unit, is set to calculate the low-band signals.

Further, a method of processing executed in the above-described device and system, a program for causing the device and system to execute the processing, and a recording medium in which the program is recorded are also included in the configurations of the present disclosure.

Further, the series of processing described in the specification can be realized by hardware, software, or a composite configuration of hardware and software. When the processing is executed by software, a program in which the processing sequence is recorded can be installed in a memory in a computer incorporated in dedicated hardware and executed, or can be installed in a general purpose computer that can execute various types of processing and executed. For example, the program can be recorded in a recording medium in advance. The program can be received through a network such as a local area network (LAN) and the Internet, and can be installed to a recording medium such as a built-in hard disk, other than being installed from the recording medium to the computer.

Note that the various types of processing described in the specification is not only executed in time series according to the description, but may also be individually executed or executed in parallel according to a processing capacity of a device to perform processing or as needed. Further, the system in the present specification is a logical set configuration of a plurality of devices, and is not limited to a configuration in which devices having respective configurations are included in the same housing.

INDUSTRIAL APPLICABILITY

As described above, according to the configuration of one embodiment of the present disclosure, a device and a method that correct a false color, which occurs in a locally highlighted region of an image, can be realized.

To be specific, a false color pixel is detected in data conversion processing of generating an RGB array image from an RGBW array image, low-band signals corresponding to respective RGBW colors that are different according to whether a pixel is a false color pixel, and the RGBW array is converted by interpolation processing to which the calculated low-band signals are applied to generate the RGB array image. The interpolation processing is performed using the low-band signals on an assumption that a W low-band signal mW, and RGB respective low-band signals mR, mG, and mB have a proportional relation in a local region. When a pixel of interest is a false color pixel, the low-band signal is calculated by an application of a low-pass filter having a coefficient in which a contribute rate of pixel values in the vicinity of the pixel of interest is made relatively lower than that of separated pixels.

With the processing, a false color, which occurs in a locally highlighted region of the image, is corrected, together with re-mosaic processing of converting the RGBW array image into the RGB array, and a high-quality image from which the false color has been removed or decreased can be generated and output.

REFERENCE SIGNS LIST

100 Imaging apparatus
105 Optical lens
110 Imaging device (image sensor)
120 Signal processing unit
130 Memory
140 Control unit
181 RGBW array
182 RGB array
183 Color image
200 Data conversion processing unit
201 False color detection unit
202 Low-band signal calculation unit
203 Pixel interpolation unit

The invention claimed is:

1. An image processing device comprising:
a data conversion processing unit configured to receive an RGBW array image as an input image, and to generate an RGB array image as an output image,
the data conversion processing unit including:
a false color detection unit configured to detect a false color pixel in the input image, and to output detection information,
a low-band signal calculation unit configured to receive the detection information from the false color detection unit, and to change a processing aspect according to the detection information to calculate low-band signals corresponding to respective RGBW colors, and
a pixel interpolation unit configured to execute pixel conversion of the RGBW array of the input image, by pixel interpolation to which the low-band signals calculated by the low-band signal calculation unit are applied, to generate the RGB array image,
wherein the pixel interpolation unit calculates an interpolation pixel value on an assumption that a low-band signal mW of a W pixel and low-band signals mR, mG, and mB of respective RGB pixels have a proportional relation in a local region and
wherein, based on receiving the detection information that a pixel of interest is the false color pixel from the false color detection unit, the low-band signal calculation unit applies a low-pass filter to which a low-pass filter coefficient in which a pixel value contribution rate of a pixel near the pixel of interest is made relatively lower than that of a pixel separated from the pixel of interest is set to calculate the low-band signals.

2. The image processing device according to claim 1, wherein
when having been input the detection information that a pixel of interest is not the false color pixel from the false color detection unit,
the low-band signal calculation unit applies a low-pass filter to which a low-pass filter coefficient in which a pixel value contribution rate of a pixel near the pixel of interest is made relatively higher than that of a pixel separated from the pixel of interest is set to calculate the low-band signals.

3. The image processing device according to claim 1, wherein
the false color detection unit detects presence/absence of existence of a locally highlighted region that is a locally high brightness region in the input image, and when a pixel of interest is included in the locally highlighted region, the false color detection unit determines that the pixel of interest is the false color pixel.

4. The image processing device according to claim 1, wherein
the false color detection unit detects incline information of W pixels near a pixel of interest, and when a W pixel value near the pixel of interest is higher than a peripheral W pixel value in both of two perpendicular directions, the false color detection unit determines that the pixel of interest is included in a locally highlighted region that is a locally high brightness region, and the pixel of interest is the false color pixel.

5. The image processing device according to claim 1, wherein the false color detection unit:
   (a) calculates W pixel low-frequency component signals corresponding to respective lines based on pixel values of a plurality of W pixels in a plurality of diagonally lower right lines set near a pixel of interest, and executes comparison processing between a difference value Diff1 between a maximum value of the W pixel low-frequency component signals of a plurality of inner-side lines close to the pixel of interest and a maximum value of the W pixel low-frequency component signals of a plurality of outer-side lines distant from the pixel of interest, and a threshold Thr1, and
   (b) calculates W pixel low-frequency component signals corresponding to respective lines based on pixel values of a plurality of W pixels in a plurality of diagonally upper right lines set near a pixel of interest, and executes comparison processing between a difference value Diff2 between a maximum value of the W pixel low-frequency component signals of a plurality of inner-side lines close to the pixel of interest and a maximum value of the W pixel low-frequency component signals of a plurality of outer-side lines distant from the pixel of interest, and a threshold Thr2, and
   as comparison results of the two cases of the above (a) and (b), when the difference value is larger than the threshold in both cases, the false color detection unit determines that the pixel of interest is the false color pixel.

6. The image processing device according to claim 1, wherein
the false color detection unit detects a false color occurring when a W pixel and a G pixel are concentrated in a locally highlighted region that is a locally high brightness region in the input image, or when a W pixel, an R pixel, and a B pixel are concentrated in the locally highlighted region.

7. The image processing device according to claim 1, wherein the false color detection unit:
   detects W pixels having a high pixel value from the input image,
   compares a configuration pattern of the detected W pixels having a high pixel value, and a registered highlighted region pattern that is a shape of a locally high brightness region recorded in a memory in advance, and
   determines that a pixel included in the configuration pattern of the W pixels having a high pixel value is the false color pixel when the configuration pattern of the detected W pixels having a high pixel value match the registered highlighted region pattern.

8. The image processing device according to claim 7, wherein
the low-band signal calculation unit applies a low-pass filter to which a low-pass filter coefficient in which a pixel value contribution rate of a highlighted region is made relatively lower than that of a pixel outside the highlighted region, according to the registered highlighted region pattern determined to match the configuration pattern of the W pixels having a high pixel value by the false color detection unit, is set to calculate the low-band signals.

9. A method of processing an image executed in an image processing device, the method comprising:
   by a data conversion processing unit, executing data conversion processing of having receiving an RGBW array image as an input image, and generating an RGB array image as an output image,
   in the data conversion processing unit, executing false color detection processing of detecting a false color pixel of the input image, and outputting detection information,
   low-band signal calculation processing of being-input receiving the detection information, and changing a processing aspect according to the detection information to calculate low-band signals corresponding to respective RGBW colors, and
   pixel interpolation processing of executing pixel conversion of the RGBW array of the input image to generate the RGB array image by pixel interpolation to which the low-band signals are applied,
   wherein in the pixel interpolation processing, calculating an interpolation pixel value based on an assumption that a low-band signal mW of a W pixel and low-band signals mR, mG, and mB of respective RGB pixels have a proportional relation in a local region and
   wherein, based on receiving the detection information that a pixel of interest is the false color pixel from the false color detection unit, the low-band signal calculation unit applies a low-pass filter to which a low-pass filter coefficient in which a pixel value contribution rate of a pixel near the pixel of interest is made relatively lower than that of a pixel separated from the pixel of interest is set to calculate the low-band signals.

10. A computer-readable storage device encoded with computer-executable instructions that, when executed by a processing device, perform an image processing method comprising:
   causing a data conversion processing unit to execute a data conversion processing step of receiving an RGBW array image as an input image, and generating an RGB array image as an output image,
   in the data conversion processing step, causing the data conversion processing unit to execute false color detection processing of detecting a false color pixel of the input image, and outputting detection information,
   low-band signal calculation processing of receiving the detection information, and changing a processing aspect according to the detection information to calculate low-band signals corresponding to respective RGBW colors, and
   pixel interpolation processing of executing pixel conversion of the RGBW array of the input image to generate the RGB array image by pixel interpolation to which the low-band signals are applied,
   wherein in the pixel interpolation processing, calculating an interpolation pixel value based on an assumption that a low-band signal mW of a W pixel and low-band signals mR, mG, and mB of respective RGB pixels have a proportional relation in a local region and
   wherein, based on receiving the detection information that a pixel of interest is the false color pixel from the false color detection unit, the low-band signal calculation unit applies a low-pass filter to which a low-pass filter coefficient in which a pixel value contribution rate of a pixel near the pixel of interest is made relatively lower than that of a pixel separated from the pixel of interest is set to calculate the low-band signals.

\* \* \* \* \*